(12) United States Patent
Getz

(10) Patent No.: US 11,396,747 B1
(45) Date of Patent: Jul. 26, 2022

(54) FRAMING SYSTEMS AND BRACKETS THEREFOR

(71) Applicant: Farm Boy Builder, LLC, Phoenix, AZ (US)

(72) Inventor: Jeffrey L. Getz, Phoenix, AZ (US)

(73) Assignee: Farm Boy Builder, LLC

( * ) Notice: Subject to any disclaimer, the term of this patent is extended or adjusted under 35 U.S.C. 154(b) by 0 days.

(21) Appl. No.: 16/994,410

(22) Filed: Aug. 14, 2020

Related U.S. Application Data

(63) Continuation-in-part of application No. 16/258,497, filed on Jan. 25, 2019, now Pat. No. 10,745,902.

(60) Provisional application No. 62/621,958, filed on Jan. 25, 2018.

(51) Int. Cl.
| | |
|---|---|
| *E04C 5/00* | (2006.01) |
| *E04B 1/41* | (2006.01) |
| *E04C 3/02* | (2006.01) |
| *F16M 13/02* | (2006.01) |
| *E04B 1/38* | (2006.01) |

(52) U.S. Cl.
CPC ............. *E04B 1/40* (2013.01); *E04C 3/02* (2013.01); *F16M 13/02* (2013.01); *E04B 2001/405* (2013.01)

(58) Field of Classification Search
CPC ....... B04B 1/2608; E04B 2/56; E04B 1/3445; E04B 1/134; E04B 1/2612; E04B 2001/2616; E04B 2001/2684; E04G 21/14; E04G 21/142; E04C 2003/026; Y10T 16/554

USPC ... 52/702, 712, 714, 715, 688, 582.1, 655.1, 52/92.2, 93.1; 16/382
See application file for complete search history.

(56) References Cited

U.S. PATENT DOCUMENTS

| | | | | |
|---|---|---|---|---|
| 1,097,934 | A * | 5/1914 | Price | F16B 9/058 403/190 |
| 4,410,294 | A ‡ | 10/1983 | Gilb | E04B 1/2612 403/232.1 |
| 4,713,923 | A ‡ | 12/1987 | Sielaff | E04B 1/2608 403/190 |
| 5,625,995 | A * | 5/1997 | Martin | E04B 1/2608 52/650.3 |
| 6,295,781 | B1 ‡ | 10/2001 | Thompson | E04B 1/2608 403/232.1 |
| 6,415,575 | B1 ‡ | 7/2002 | Thompson | E04B 1/2608 52/712 |
| 6,430,890 | B1 * | 8/2002 | Chiwhane | E04B 1/2403 52/655.1 |
| 7,104,024 | B1 * | 9/2006 | diGirolamo | E04B 2/767 403/231 |
| 7,398,620 | B1 ‡ | 7/2008 | Jones | E04B 7/045 52/643 |
| 7,530,206 | B2 ‡ | 5/2009 | Getz | E04H 4/08 52/169 |

(Continued)

*Primary Examiner* — Chi Q Nguyen
(74) *Attorney, Agent, or Firm* — Thomas W. Galvani, P.C.; Thomas W. Galvani

(57) ABSTRACT

A bracket for hanging a joist with respect to a vertical surface includes a brace having a top, an opposed bottom, a front, and an opposed back. An extends from the back of the brace, proximate the top. A boom, proximate the bottom, extends from the back of the brace to a flange, and a gap is defined between the ear and the flange. The ear and the flange are independently poseable with respect to the brace.

20 Claims, 19 Drawing Sheets

(56) References Cited

U.S. PATENT DOCUMENTS

| | | | | |
|---|---|---|---|---|
| 7,753,327 | B2 * | 7/2010 | Wooten | A47B 96/061 |
| | | | | 248/248 |
| 8,225,575 | B2 * | 7/2012 | Gadd | E04B 1/2612 |
| | | | | 52/713 |
| 8,540,201 | B2 * | 9/2013 | Gadd | E04B 1/2608 |
| | | | | 248/300 |
| 8,656,681 | B1 ‡ | 2/2014 | Iannelli | E04D 13/158 |
| | | | | 52/745.21 |
| 8,800,232 | B1 ‡ | 8/2014 | Keenan | E04B 1/41 |
| | | | | 14/74.5 |
| 9,290,928 | B2 * | 3/2016 | Klein | E04B 1/2403 |
| 9,650,780 | B2 ‡ | 5/2017 | Tan | E04B 1/2608 |
| 10,017,934 | B2 * | 7/2018 | Getz | E04B 7/16 |
| 10,024,048 | B2 ‡ | 7/2018 | Getz | E04B 5/10 |
| 10,745,902 | B1 * | 8/2020 | Getz | E04B 1/40 |
| 11,078,665 | B2 * | 8/2021 | Daudet | E04B 2/62 |
| 2003/0093969 | A1 * | 5/2003 | Saldana | E04B 1/2403 |
| | | | | 52/715 |
| 2007/0089841 | A1 * | 4/2007 | Rossato | E06B 9/323 |
| | | | | 160/178.1 R |
| 2008/0209845 | A1 ‡ | 9/2008 | Lin | E04B 1/2608 |
| | | | | 52/712 |
| 2011/0219720 | A1 * | 9/2011 | Strickland | E04B 1/24 |
| | | | | 52/655.1 |
| 2014/0305067 | A1 ‡ | 10/2014 | Vending | E04G 21/14 |
| | | | | 52/688 |

\* cited by examiner
‡ imported from a related application

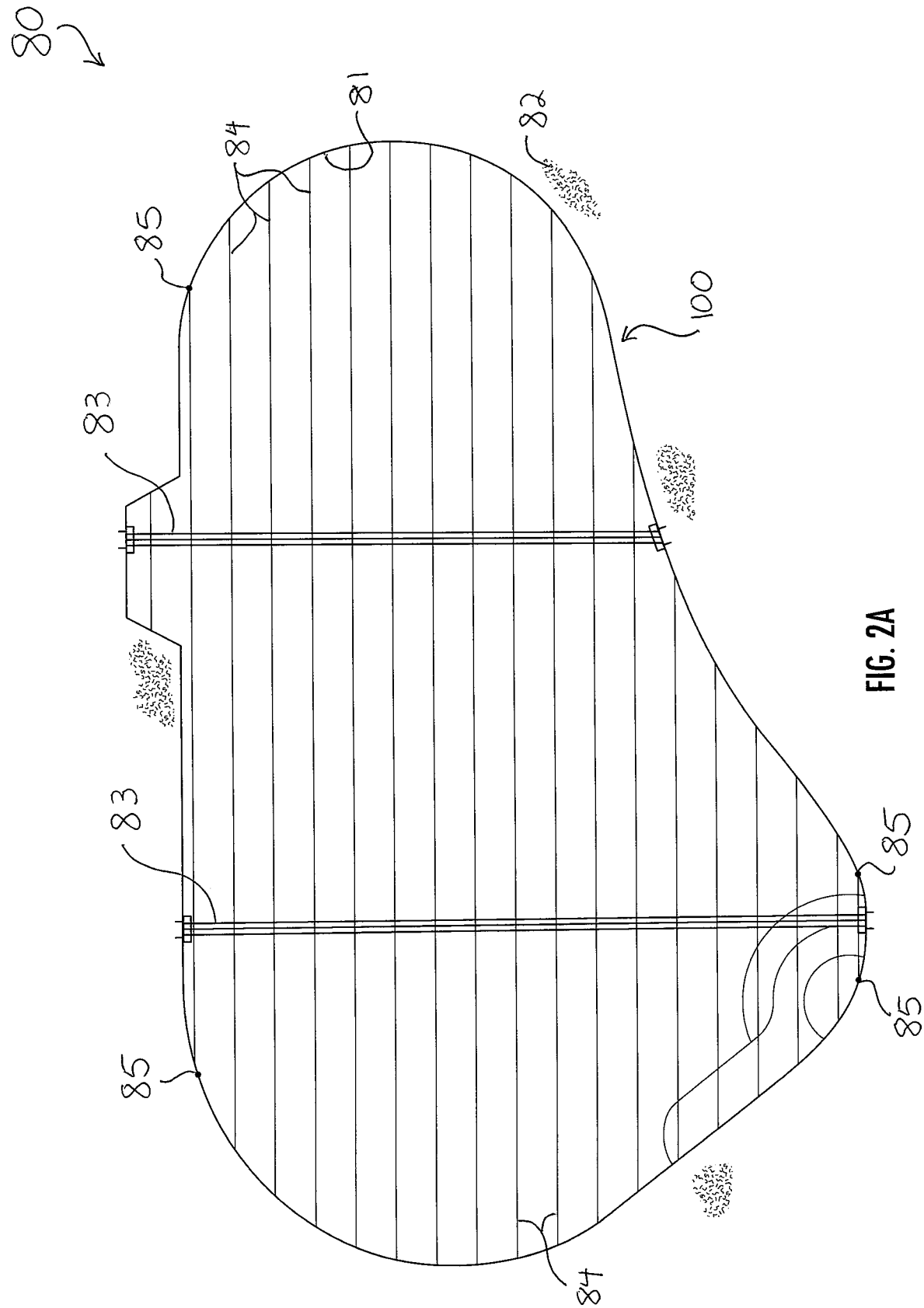

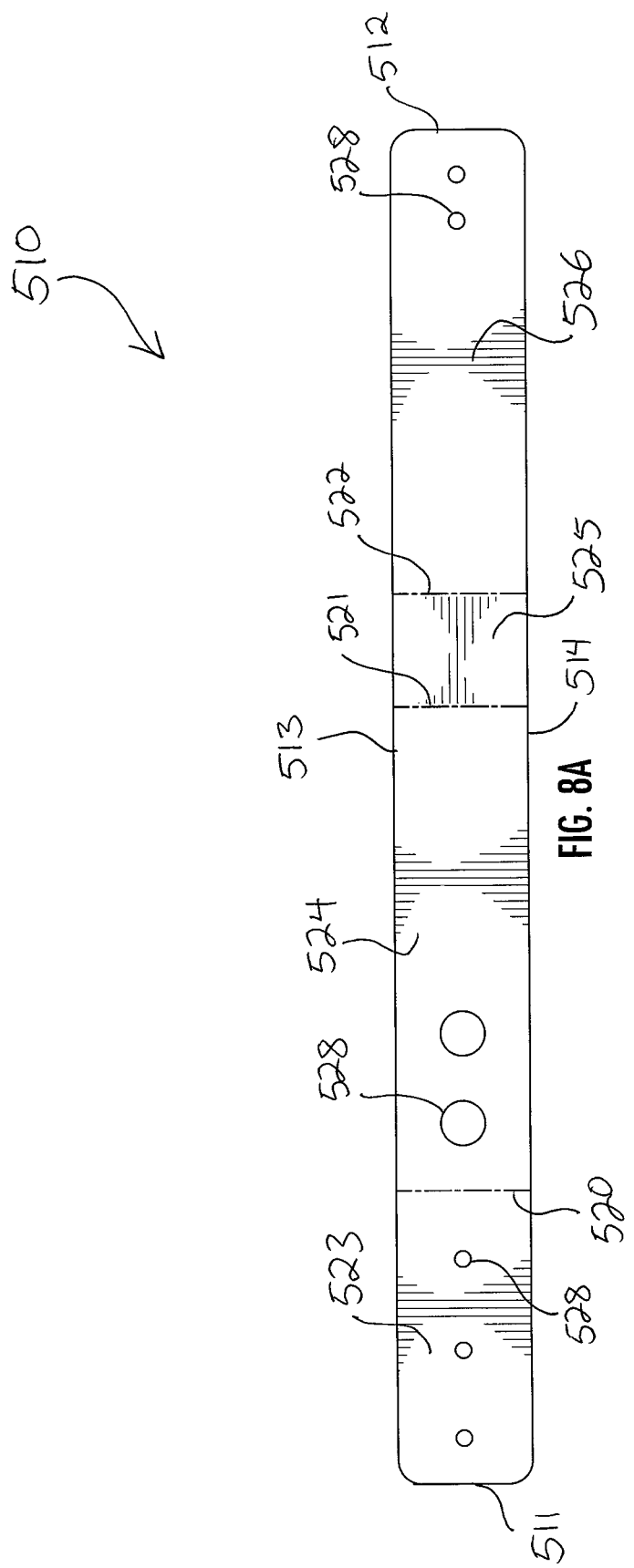

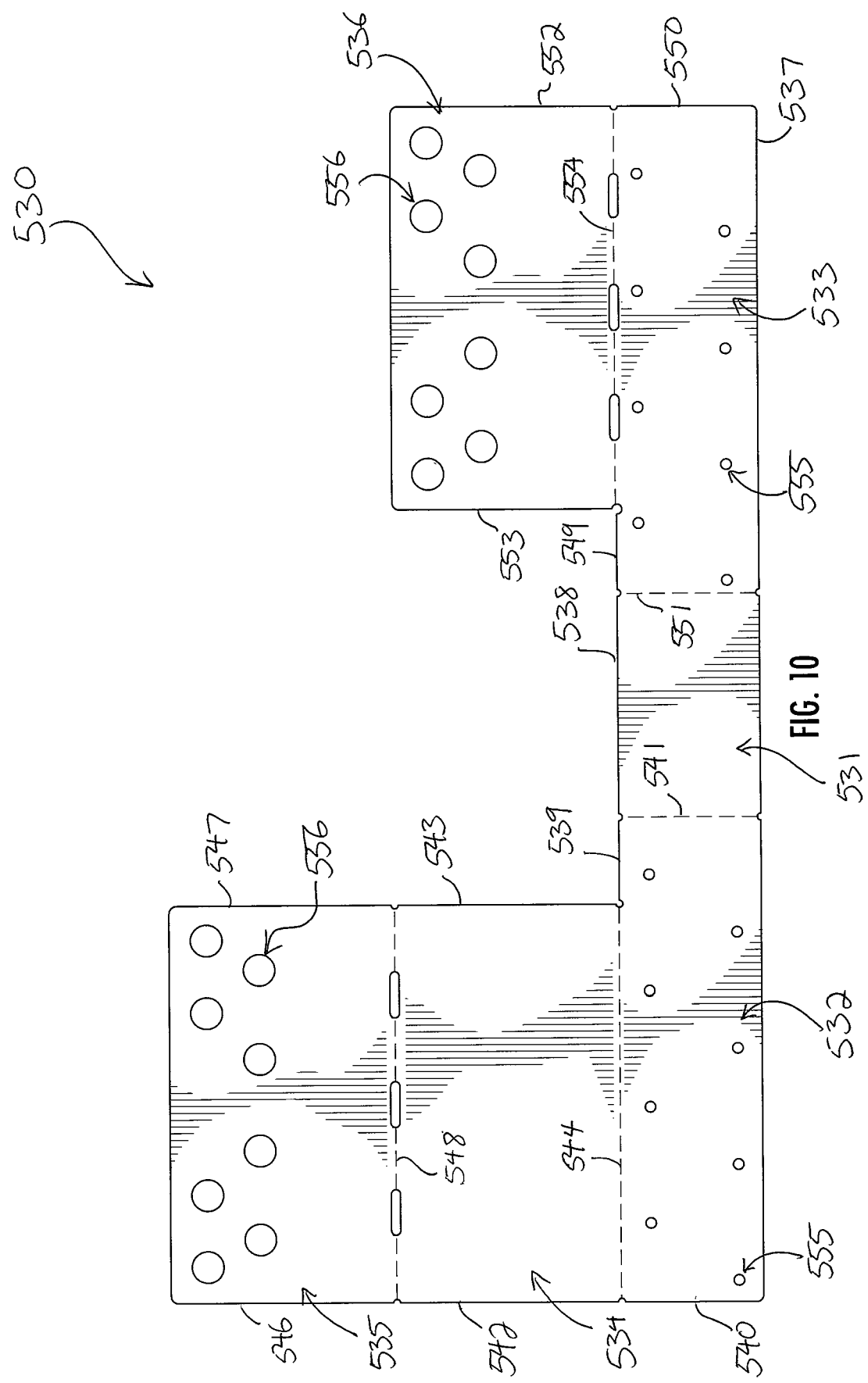

FRAMING SYSTEMS AND BRACKETS THEREFOR

CROSS-REFERENCE TO RELATED APPLICATIONS

This application is a continuation of and claims the benefit of U.S. patent application Ser. No. 16/258,497, filed Jan. 25, 2019, now U.S. Pat. No. 10,745,902, which claimed the benefit of U.S. Provisional Application No. 62/621,958, filed Jan. 25, 2018, both of which are hereby incorporated by reference.

FIELD

The present specification relates generally to framing systems, and more particularly to joist support brackets.

BACKGROUND

Decks are flat and rigid surfaces, generally for supporting live loads at an elevated surface. Decks are frequently constructed over a void or rough terrain, so as to provide a safe and reliable surface on which people may walk and stand over that terrain. They offer convenience by minimizing the need to step up and down to and from living and outdoor areas.

Decks are usually supported by a frame assembly below the deck. Such deck frame assemblies are often constructed with wood or steel beams and joists coupled, braced, and attached at regular intervals and standard angles, such as thirty, forty-five, sixty, and ninety degrees. Decks constructed on straight walls or around rectangular houses lend themselves well to such standard construction techniques.

The building environment is not always standard, however. For instance, many pools have irregular shapes. "Kidney pools," for example, have substantially kidney-shaped perimeters, generally with two or three round lobes disposed along a curve. While rectangular pools can be decked around or over fairly routinely, these kidney pools present difficulties. The odd angles of an irregular perimeter create extremely challenging connections since commercially-available brackets are only available in a few standard angles, such as forty-five and ninety degrees. However, the odd angles of an irregular perimeter require deck installers to adapt conventional brackets or custom-craft individual connections among the structural elements. Other structures may have one or more design "problems" that make use of conventional right-angle brackets difficult.

For decks that overlie pools, other challenges exist. Laying the decking planks flush with the surrounding pool deck requires a supporting structural framework that is generally secured to the pool walls. However, many pools have an overhanging lip at the top of the pool wall. This lip may be only a few inches tall, and anchors for brackets drilled into the lip would be close to the deck surface and thus present a risk of cracking the deck or even failing to support the joist.

Further still, for decks overlying pools, fitting the deck frame assembly is a challenge because of the irregularity of the perimeter. Each frame member must generally be custom cut; while off-site cutting can be economical, it is vulnerable to mis-measurement. Cutting on site is slow but more likely to be accurate. An improved deck system is needed.

SUMMARY

A bracket for hanging a joist with respect to a vertical surface includes a brace having a top, an opposed bottom, a front, and an opposed back. An extends from the back of the brace, proximate the top. A boom, proximate the bottom, extends from the back of the brace to a flange, and a gap is defined between the ear and the flange. The ear and the flange are independently poseable with respect to the brace.

The above provides the reader with a very brief summary of some embodiments described below. Simplifications and omissions are made, and the summary is not intended to limit or define in any way the disclosure. Rather, this brief summary merely introduces the reader to some aspects of some embodiments in preparation for the detailed description that follows.

BRIEF DESCRIPTION OF THE DRAWINGS

Referring to the drawings:

FIGS. 2A-2D illustrate a sequence of steps of planning and installing a deck framing system over an empty pool;

FIGS. 8A and 8B are elevation and perspective views, respectively, of an embodiment of a bracket for holding perimeter supports;

FIG. 10 is an elevation view of an embodiment of a bracket for holding beams.

DETAILED DESCRIPTION

Figure 1:
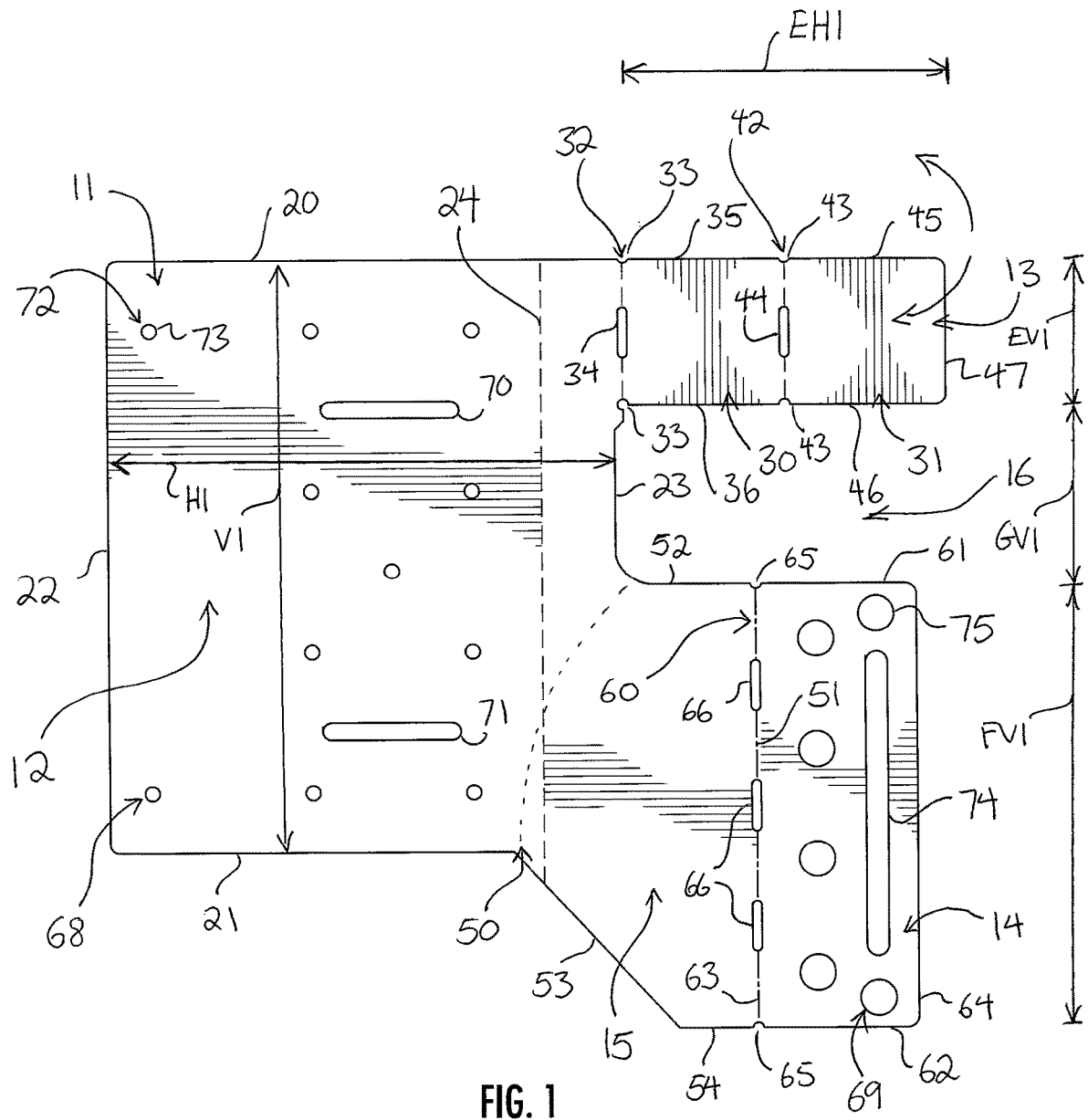
FIG. 1 is an elevation view of an embodiment of a bracket for supporting joists.

Reference now is made to the drawings, in which the same reference characters are used throughout the different figures to designate the same elements. FIG. 1 is an elevation view of an offset bracket 10 for supporting joists of a deck framing system. The bracket 10 is an embodiment of several brackets suitable for supporting joists of a deck framing system 100, of the kind shown in FIGS. 2A-2D. Such deck framing systems 100 are useful, at least, when a swimming pool is no longer needed and the owners desires to cover it rather than fill it in. A team is required to cover such a pool in this fashion, and they generally begin by installing a few beams across the width of the pool. These beams are typically anchored into the pool wall with the brackets shown in FIGS. 7A-11B. Sometimes the beams will be further supported with upstanding posts from the bottom of the pool. Atop the beams, extending transverse to the beams, are joists. The workers hang many joists along the length of the pool. These joists are supported with the bracket embodiments shown in FIGS. 1 and 3-6. Then finally, finished decking planks are laid atop the joists.

FIG. 1 illustrates the bracket 10 in a flat, stamped configuration, as it would appear just after fabrication and before it has been bent into shape for use in the assembly and installation of the deck frame. The bracket 10 includes a thin body 11 having a brace 12, an ear 13 for aligning the bracket 10 to a wall and supporting a perimeter support, a mounting flange 14 for aligning and securing the bracket 10 to a wall such as the wall of a pool, a boom 15 connecting the flange 14 with the brace 12, and an elongate gap 16 between the ear 13 and both the flange 14 and the boom 15. The body 11 is unitary; the brace 12, ear 13, flange 14, and boom 15 are integrally and monolithically formed as a single piece, preferably constructed of a material having very good rigidity, shear strength, durability, and anti-corrosion properties, such as galvanized steel. The body 11 is thin between opposed major sides.

The brace 12 includes a top 20, an opposed bottom 21, a front 22, and an opposed back 23. The back 23 of the brace 10 is directed rearwardly toward the wall, and as such, the front 22 projects away from the wall, for example, into the pool. The top 20 and bottom 21 of the brace 10 identify the preferred directional alignment of the bracket 10 when installed; in other words, the top 20 is preferably directed up and the bottom 21 is preferably directed down. Briefly, directional terms are used throughout this description to identify a direction or a relative arrangement of two elements or features. For instance, the terms "up," "upward," or "above" may all be used to indicate something is generally toward or above the top 20, versus the terms "down," "downward," or "below." Similarly, terms indicating relative lateral arrangement, such as "forward," "front," "ahead," "behind," "back," or "rearward" may be used as well. Moreover, the terms "horizontal" and "vertical" are used in this description with respect to this orientation, where horizontal generally indicates oriented parallel to a line extending between the front 22 and back 23 of the brace 12, and vertical generally indicates oriented parallel to a line extending between the top 20 and bottom 21 of the brace 12.

The brace 12 is roughly rectangular, having a slightly greater height along a vertical dimension V1 (between the top 20 and bottom 21) than length along a horizontal dimension H1 (between the front 22 and back 23). The vertical dimension V1 is about ten percent larger than the horizontal dimension H1. The edges along the top 20, bottom 21, front 22, and back 23 are straight, and the corners formed therebetween are rounded. The top 20 and bottom 21 are parallel to each other and perpendicular to each of the front 22 and back 23, which are parallel to each other.

The ear 13 projects rearwardly from the back 23 of the brace 12 of the bracket 10, at the top 20 of the brace 12. The ear 13 includes a front tab 30 and a rear tab 31. The front and rear tabs 30 and 31 are substantially similar in size, each being substantially rectangular and smaller than the brace 12. The ear 13 has a horizontal dimension EH1 which is roughly two-thirds the horizontal dimension H1, and a vertical dimension EV1 which is approximately one-quarter the vertical dimension V1. The front tab 30 is pivotally mounted to the back 23 of the brace 12 along a living hinge 32 defined between the brace 12 and the front tab 30. The living hinge 32 is a pre-defined bend line or hinge point of the ear 13 which is bent to a desired orientation during installation of the bracket 10. As the term is used throughout this description, "living hinge" is meant to describe a flexible and integral portion of the body 11 which can be bent using hand tools by an on-site installer and is contrasted with a hinge formed by a knuckled joint or other mechanical assembly. In this description, a living hinge is not freely flexible or adjustable: it will not move inadvertently or in response to a minimal application of force, and it will preferably not move when manually manipulated without the assistance of hand tools or lever arms. Once adjusted, a living hinge will hold its adjustment until it is again exposed to a similar non-minimal force.

The living hinge 32 includes two semi-circular notches 33, at the top and bottom of the front tab 30, formed into the body 11 of the bracket 11, as well as an elongate slit 34 aligned vertically and between the notches 33. The notches 33 and the slit 34 are formed entirely through the thickness of the body 11, and as such, define voids or cavities in the body 11. Therefore, there is less material in this portion of the body 11, and it can be flexed more easily there than at most other parts of the body 11. The broken line extending vertically between the slit 34 and the notches 33 identifies the living hinge 32 connecting the front tab 30 to the back 23 of the brace 12. The living hinge 32 is parallel to the front 22 of the brace 12.

The front tab 30 has a top 35 which is aligned with and contiguous to the top 20 of the brace 12, but for the small notch 33. The front tab 30 also has a bottom 36 opposed to the top 35 which extends rearwardly from the lower notch 33 at the back 23 of the brace 12. The top 35 and bottom 36 are parallel to each other and perpendicular to the living hinge 32.

The rear tab 31 of the ear 13 is pivotally mounted to the back of the front tab 30 along another living hinge 42. This living hinge 42 is also a pre-defined bend line or hinge point of the ear 13, in an intermediate location along its lateral length. The living hinge 42 is bent to a desired orientation during installation of the bracket 10 to assist in positioning and aligning the bracket 10 and in installing a perimeter support. The living hinge 42 includes two semi-circular notches 43, at the top and bottom of the rear tab 31, as well as an elongate slit 44, aligned vertically and between the notches 43. The notches 32 and the slit 44 are formed entirely through the thickness of the body 11, and as such, define voids or cavities in the body 11. Therefore, there is less material along the living hinge 42, and it can be flexed more easily there than at most other parts of the body 11. The broken line identifies the living hinge 42 connecting the rear tab 31 to the back of the front tab 30. The living hinge 42 is parallel to the living hinge 32 and to the front 22 of the brace 12.

The rear tab 31 has a top 45 which is aligned with and contiguous to the top 20 of the brace and to the top 35 of the front tab 30, but for the small notch 33. The rear tab 31 also has a bottom 46 which is aligned with and contiguous to the bottom 36 of the front tab 30. The top 45 and bottom 46 of the rear tab 31 are aligned with and contiguous to the top and bottom of the front tab 30, but for the small notches 43. The rear tab 31 has a back 47 which terminates the ear 13, and which is perpendicular to the top 45 and bottom 46.

As will be explained, the rear tab 31 provides a mounting location for a perimeter support, and the front tab 30 extends between the rear tab 31 to the brace 12. The front and rear tabs 30 and 31 are each pivotally mounted and can be flexed either into the page or out of the page, as shown with the two arrowed arcuate lines in FIG. 1 behind the rear tab 31. In other words, the front tab 30 may be flexed to the left or right through nearly 360 degrees of rotation. Similarly, the rear tab 31 may be flexed to the left or right, regardless of the orientation of the front tab 30, through a similar range of angles.

Below the ear 13, the boom 15 projects downwardly and rearwardly away from the brace 12. The boom 15 is a roughly triangular-shaped piece of the body 11, extending away from the bottom 21 and back 23 of the brace 12. The boom 15 is and remains co-planar with at least a rear portion of the brace 12 during installation and operation. The boom 15 serves as an extension from the brace 12 to the flange 14. The boom 15 includes a front (shown in broken line in FIG. 1), an opposed back 51, a horizontal top 52, and an opposed diagonal 53 and bottom 54. The boom 15 thus provides a vertical and horizontal offset from the wall, supporting the brace 12 both above the flange 14 and away from it.

The flange 14 is formed to the back 51 of the boom 15 along another living hinge 60, and is mounted to the boom 15 for adjustable, pivotal movement with respect thereto. This living hinge 60 is a pre-defined bend line or hinge point which is bent to a desired orientation during installation of the bracket 10. The living hinge 60 is registered between the living hinges 32 and of the ear 13, such that the flange 14 bends at an offset location with respect to ear 13. The flange 14 includes a top 61 and opposed bottom 62, and a front 63 and opposed back 64. The flange 14 has a vertical dimension FV1 which is approximately three-quarters the vertical dimension V1. The top 61 of the flange 14—and the top 52 of the boom 15—is set apart from the bottoms 36 and 46 of the front and rear tabs 30 and 31 of the ear 13 by the gap 16, at a vertical dimension GV1. The vertical dimension GV1 is approximately three-tenths the vertical dimension V1. Further, in this way, the flange 14 is vertically offset from the brace 13 such that the top 61 of the flange 14 is above the bottom 21 of the brace 12 and the bottom 62 of the flange 14 is below the bottom 21 of the brace 12. The bottom 21 of the brace 12 is registered approximately two-thirds down the vertical dimension FV1 from top 61 of the flange 14. The flange 14 also a horizontal dimension FH1 which is approximately one-third the horizontal dimension H1. The living hinge 60 includes two semicircular notches 65 formed into the body 11 at the opposed top 61 and bottom of the flange 14, as well as elongate slits 66 aligned vertically and between the notches 65. In this embodiment of the bracket 10, there are three slits 66; in other embodiments, there are more or less, so long as an installer in the field can bend the flange 14 with respect to the boom 15. The notches 65 and slits 66 are formed entirely though the thickness of the body 11, and as such, define voids or cavities in the body 11 where there is less material, so that the body 11 may be flexed more easily there than at other parts of the body 11. The broken line identifies the living hinge 60 connecting the flange 14 to the back 51 of the boom 15. The living hinge 60, as can be seen, is parallel to the front 22 of the brace 12.

Both the brace 12 and the flange 14 carry bore patterns 68 and 69 so that the bracket 10 may be applied to a joist and to the side wall. The bore pattern 68 in the brace 12 includes thin elongate slots and small circular holes. The brace 12 has two horizontal slots 70 and 71 vertically registered with each other. The slots 70 and 71 are each slender and aligned between the front 22 and back 23 of the brace 12. The slot 70 is registered above the slot 71; the slot 70 is generally at the same height as the bottom of the ear 13, or aligned with the bottoms 36 and 46 of the front and rear tabs 30 and 31. A hole pattern 72 includes eleven circular holes 73 formed in an array through the brace 12: three holes 73 are spaced apart from each other above the slot 70, five holes 73 are spaced apart from each other between the slots 70 and 71, and three holes 73 are spaced apart from each other below the slot 71. In other embodiments, a lesser or greater number of holes may be formed through the bracket 10 as is necessary to carry the rated load.

In the flange 14, the bore pattern 69 includes a wider elongate slot 74 and larger circular holes 75. The slot 74 is aligned vertically, parallel and proximate to the back 64 of the flange 14. One hole 75 each is disposed directly above and below the slot 74, and four holes 75 are spaced apart from each other in front of the slot 74 and are arranged in vertical alignment. The slot 74 is axially longer and wider than the slots 70 and 71, and the holes 75 have larger diameters than do the holes 73. The larger slot and holes are useful to accommodate larger fasteners for securing the bracket 10 to masonry such as a pool wall than are necessary to secure the bracket 10 to a joist.

In operation, the bracket 10 is useful for hanging joists across open spaces such as, but not limited to, an empty pool. It is briefly noted that the bracket 10, like all of the brackets disclosed in this description, has a left or right orientation; each is to be either a left- or right-installed bracket. For example, the bracket 10 may be a left bracket. However, one having ordinary skill in the art will readily appreciate the "right bracket" is merely the mirror identical of the "left bracket." This is true for all brackets disclosed herein, and so no limitation should be construed as to the particular right- or left-orientation shown or described. FIG. 2A illustrates an exemplary in-ground pool 80. The pool has an irregular and circuitous pool wall 81, a deck 82 surrounding the pool wall 81, and various features within the pool basin. Two main beams 83 span the width of the pool 80, and a plurality of joists 84 sit atop the beams 83 and span the length of the pool 80. The brackets 10 support the joists 84. Each bracket 10 is installed on the pool wall 81 so that a joist 84 can be hung in an offset fashion to the wall 81. The bracket 10 provides some flexibility in adjustment of horizontal angular orientation with respect to the wall 81. The bracket 10 further provides flexibility in installing both the bracket 10 to the wall 81 and the joist 84 to the bracket 10. The slots 70, 71, and 74 allow installers to set the bracket 10 to the vertical surface and joist and then adjust the horizontal or vertical registration of the bracket 10 within a range. The installers can then bend the bracket 10 as needed to achieve the desired angle to a complemental bracket 10 on an opposed side of the pool 80. Returning briefly to FIG. 2, a living hinge or bend line 24 is shown proximate the back 23 of the brace 12; the bend line 24 is a pre-defined bend or hinge point, a vertical section of the brace 12 at which the bracket 10 can be bent to set the brace 12 at an angle with respect to the flange 14 and the boom 15. The bend line 24 extends vertically through the entirety of the brace 12, from the top 20 to the bottom 21. This bend line 24 allows the bracket 10 to set joists 84 at extreme angles with respect to the pool wall 81, such as at points 85 around the pool 80.

Figure 2B:
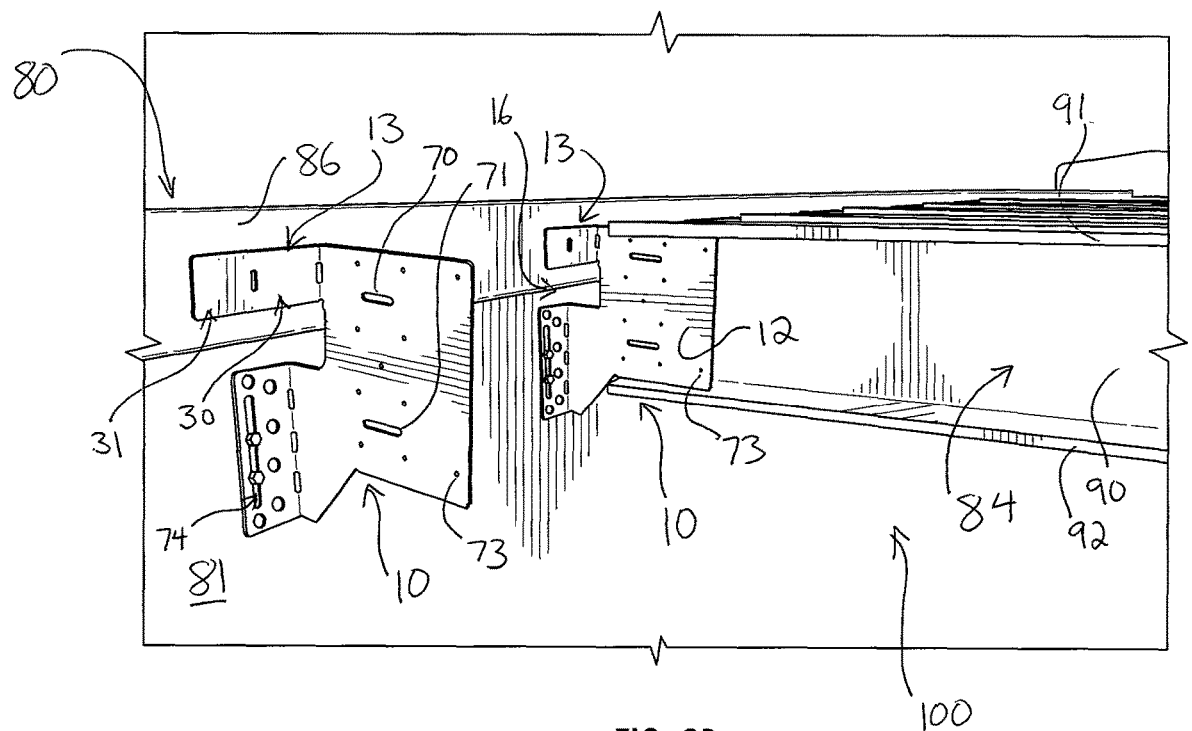
Figure 2C:
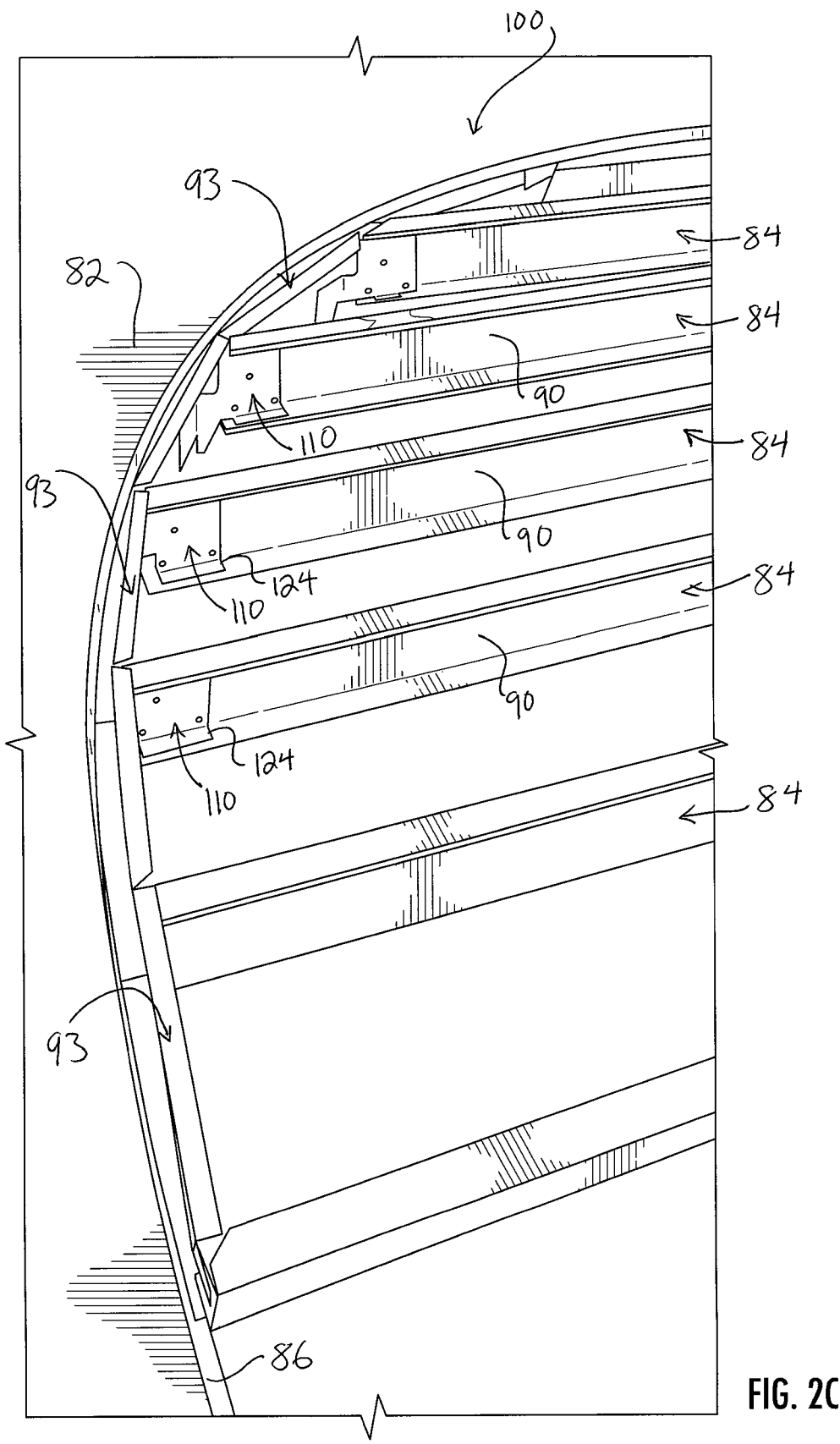
Figure 2D:
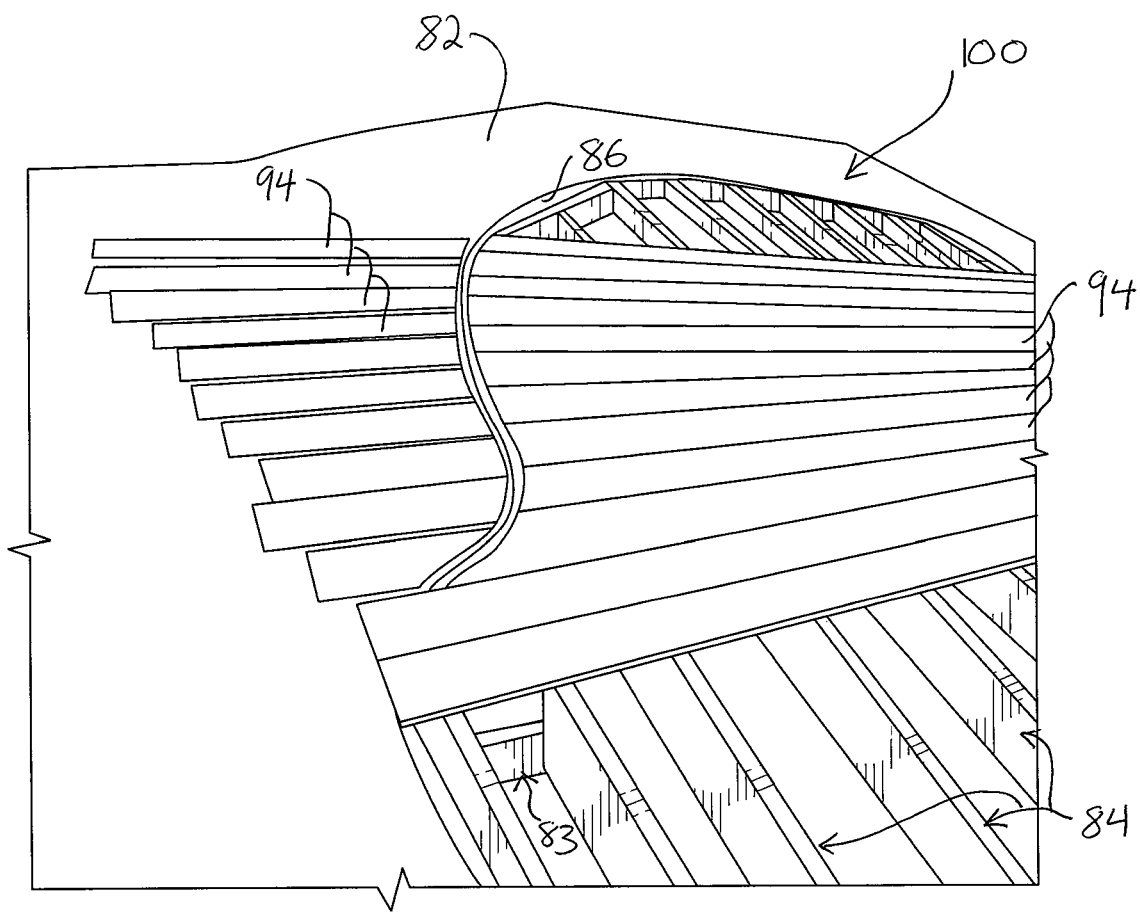

FIG. 2B illustrates brackets 10 fastened into the pool wall 81, just below a pool edge 86. One of the brackets 10 is fit with a joist 84 while another waits to be coupled to a joist 84. FIGS. 2C and 2D show other steps of installation of brackets and frame systems, as will be discussed later.

Figure 3:
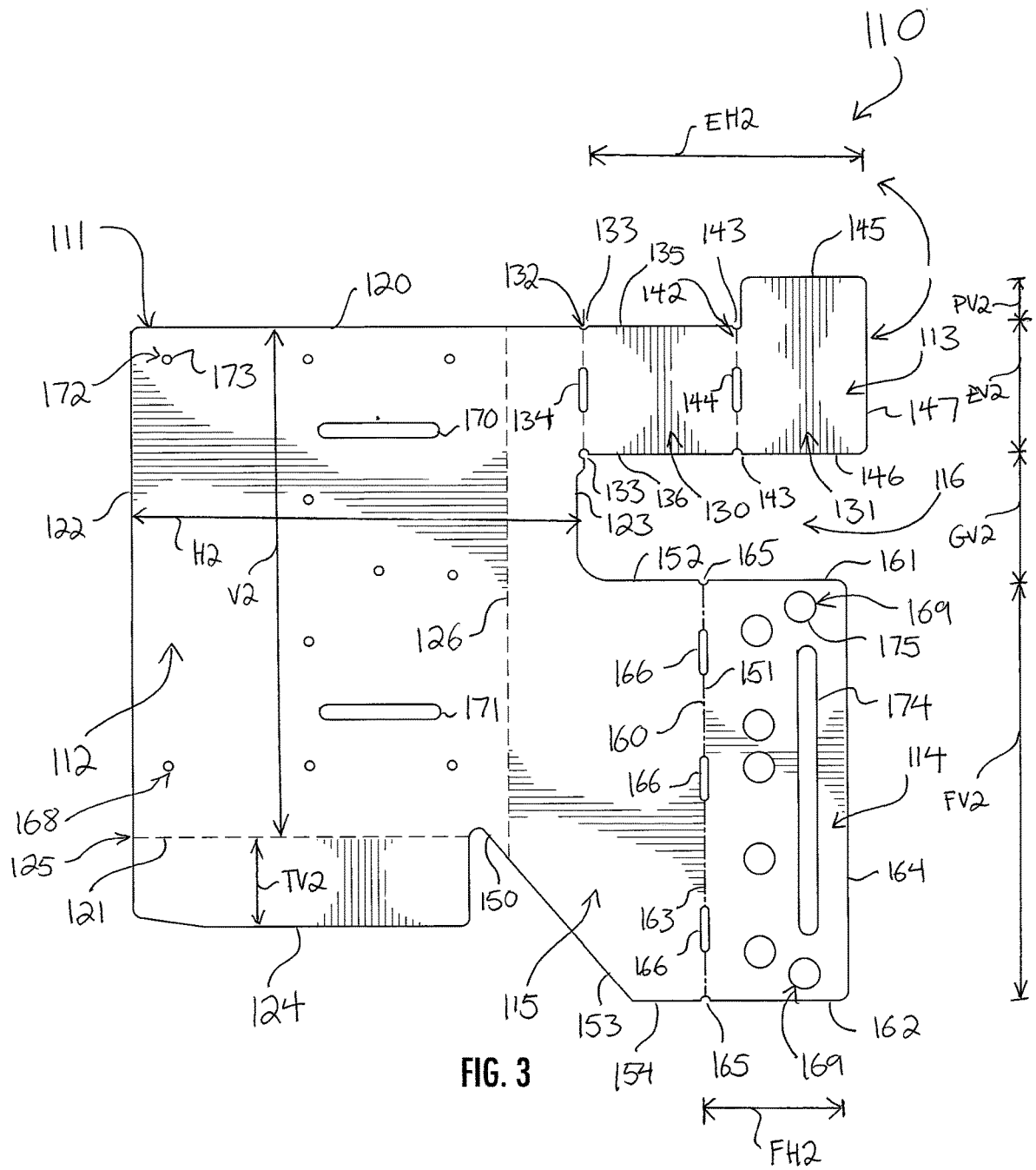
FIGS. 3-6 are elevation views of embodiments of brackets for supporting joists.

FIG. 3 is an elevation view of an offset bracket 110 for supporting joists of a deck frame assembly. FIG. 3 illustrates the bracket 110 in a flat, stamped configuration, as it would appear just after fabrication and before it has been bent into shape for use in the deck frame assembly. The bracket 110 is identical to the bracket 10 in almost every respect but for some structural differences. As such, the naming convention used to describe and identify the various structural elements and features of the bracket 10 are adopted and used to describe and identify the same various structural elements and features, but with a slight modification: the reference characters of elements and features of the bracket 110 have a prefix "1" in the hundreds place. For instance, while the bracket 10 includes a body 11, a brace 12, an ear 13, etc., the bracket 110 includes a body 111, a brace 112, and an ear 113. This modification avoids confusion between the structural elements and features of the different bracket embodiments.

The bracket 110 includes a thin body 111 having a brace 112, an ear 113 for aligning and securing the bracket 110 to a wall, a mounting flange 114 also for aligning and securing the bracket 110 to a wall, a boom 115 connecting the flange with the brace 112, and a gap 116 between the ear 113 and both of the flange 114 and the boom 115. The body 111 is monolithic; the brace 112, ear 113, flange 114, and boom 115 are integrally formed as a single piece, preferably constructed of a material having very good rigidity, shear strength, durability, and anti-corrosion properties, such as galvanized steel. The body 111 is thin between opposed major sides.

The brace 112 includes a top 120, an opposed bottom 121, a front 122, and an opposed back 123. A tab 124 is formed integrally to the bottom 121 of the brace 112 and extends entirely along the bottom 121 between the front 122 and the boom 115. The tab 124 is formed to the bottom 121 along a living hinge or bend 125 identified in FIG. 3 with a broken line. The bend 125 is a pre-defined bend or hinge point which is bent during manufacture to a desired orientation (typically ninety degrees) during installation of the bracket 110. In some embodiments, however, the bend 125 may be a living hinge as described above. Generally, though, the tab 124 projects laterally outward from the brace 112 and supports the lower flange of the joist 84. The tab 124 has a vertical dimension TV2 which is approximately two tenths the vertical dimension V2; the tab 124 also has a horizontal dimension which is nearly equivalent to the distance between the front 122 of the brace 112 and the front 150 of the boom 115. The tab 124 may be bent either to the left or right of the brace 112 (in FIG. 3, the left and right directions correspond to into and out of the page), so that the entirety of the vertical dimension TV2 is available to be placed in contact against the lower flange of the joist 84. Moreover, the bottom edge of the tab 124, proximate to its front, is slightly beveled.

The back 123 of the brace 110 is directed rearwardly toward the wall 81, and as such, the front 122 projects away from the wall 81, for example, into the pool. Again, the terms top 120 and bottom 121 of the brace 110 also identify the preferred alignment of the bracket 110 when installed. The brace 112 is roughly rectangular, having a slightly greater height (between the top 120 and bottom 121) than length (between the front 122 and back 123). The brace 12 has a horizontal dimension H2 and a vertical dimension V2 which is approximately ten percent larger than the horizontal dimension H2. The edges along the top 120, bottom 121, front 122, and back 123 are straight, and the corners formed therebetween are rounded. The top 120 and bottom 121 are parallel to each other and perpendicular to each of the front 122 and back 123, which are parallel to each other.

The ear 113 projects rearwardly from the back 123 of the brace 112 of the bracket 110, at the top 120 of the brace 112. The ear 113 includes a front tab 130 and a rear tab 131. The front and rear tabs 130 and 131 are substantially similar in size, each being substantially rectangular and smaller than the brace 112. The ear 113 has a horizontal dimension EH2 which is approximately two-thirds the horizontal dimension H2, and the front tab 130 has a vertical dimension EV2 which is approximately one-quarter the vertical dimension V2. The front tab 130 is pivotally mounted to the back 123 of the brace 112 along a living hinge 132. The living hinge 132 is a pre-defined bend line or hinge point of the ear 113 with respect to the brace 112, which is bent to a desired orientation during installation of the bracket 110. The living hinge 132 includes two semi-circular notches 133, at the top and bottom of the front tab 130, formed into the body 111 of the bracket 111, as well as an elongate slit 134, aligned vertically and between the notches 133. The notches 133 and the slit 134 are formed entirely through the thickness of the body 111, and, as such, define voids or cavities in the body 111. Therefore, there is less material in this portion of the body 111 and it can be flexed more easily there than at most other parts of the body 111. The broken line identifies the living hinge 132 connecting the front tab 130 to the back 123 of the brace 112. The front tab 130 has a top which is aligned with and contiguous to the top 120 of the brace 12, but for the small notch 33. The living hinge 132 is parallel to the front 122 of the brace 112.

The front tab 130 has a top 135 which is aligned with and contiguous to the top 120 of the brace 112, but for the small notch 133. The front tab 130 also has a bottom 136 opposed to the top 136 which extends rearwardly from the lower notch 133 at the back 123 of the brace 112. The top 135 and bottom 136 are parallel to each other and perpendicular to the living hinge 132.

The rear tab 131 of the ear 113 is pivotally mounted to the back of the front tab 130 along a living hinge 142. This living hinge 142 is also a pre-defined bend line or hinge point of the ear 113, roughly along its middle, which is bent to a desired orientation during installation of the bracket 110. The living hinge 142 includes two semi-circular notches 143, at the top and bottom of the rear tab 131, as well as an elongate slit 144, aligned vertically and between the notches 143. The notches 143 and the slit 144 are formed entirely through the thickness of the body 111, and as such, define voids or cavities in the body 111. Therefore, there is less material in this portion of the body 111 at the living hinge 142, and it can be flexed more easily there than at most other parts of the body 111. The broken line identifies the living hinge 142 connecting the rear tab 131 to the back of the front tab 130. The living hinge 142 is parallel to the living hinge 132 and to the front 122 of the brace 112.

The rear tab 131 has a top 145 and an opposed bottom 146 which are parallel to each other and perpendicular to the living hinge 142. The bottom 146 of the rear tab 131 is aligned with and contiguous to the bottom 136 of the front tab 130, but for the notch 143. However the top 145 of the rear tab 131 is above the top 135 of the front tab 130: the rear tab 131 thus has a height which is greater than its width. The top 145 of the rear tab 131 projects above the tops 135 and 120 of both the front tab 130 and the brace 110, respectively. The top 145 of the rear tab 131 has a vertical dimension PV2 above the top 135 of the front tab 130 which is approximately four-tenths the vertical dimension EV2 of the front tab 130, so that it projects just less than halfway higher than the front tab 130. The rear tab 131 has a back 147 which terminates the ear 113, and which is perpendicular to the top 145 and bottom 146. As will be explained, the rear tab 131 aligns the bracket 110 with the wall and provides a mounting location for a perimeter support, and the front tab 130 extends between the rear tab 131 to the brace 112. The added height at the top 145 of the rear tab 131 assists some installers in setting the correct height of the bracket 110 under the overhanging lip of a pool, so that the top 120 of the brace 110 is sufficiently below the pool deck height.

The front and rear tabs 130 and 131 are each pivotally mounted and can be flexed either into the page or out of the page, as shown by the two arrowed arcuate lines in FIG. 3 behind the rear tab 131. In other words, the front tab 130 may be flexed to the left or right through nearly 360 degrees of rotation. Similarly, the rear tab 131 may be flexed to the left or right, regardless of the orientation of the front tab 130, through a similar range of angles.

Below the ear 113, the boom 115 projects downwardly and rearwardly away from the brace 112. The boom 115 is a roughly triangular-shaped piece of the body 111, extending from the bottom 121 and back 123 of the brace 112. The boom 115 is and remains co-planar with a rear portion of the brace 112 during installation and operation. The boom 115 serves as an extension from the brace 112 to the flange 114. The boom 115 includes a front 150, an opposed back 151, a horizontal top 152, and an opposed diagonal 153 and bottom 154. The distance between the top 152 of the boom 115 and the bottom of the ear 113 is roughly equivalent to the height of the front tab 130 of the ear 113 between its top 135 and bottom 136.

The flange 114 is formed to the back 151 of the boom 115 along a living hinge 160, and is mounted to the boom 115 for adjustable, pivotal movement with respect thereto. This living hinge 160 is a pre-defined bend or hinge point which is bent to a desired orientation during installation of the bracket 110. The living hinge 160 is registered between the living hinges 132 and 142 of the ear 113, such that the flange 114 bends at an offset location with respect to ear 113. The flange 114 includes a top 161 and opposed bottom 162, and a front 163 and opposed back 164. The flange 114 has a vertical dimension FV2 which is approximately eight-tenths the vertical dimension V2. The top 161 of the flange 114—and the top 152 of the boom 115—is set apart from the bottoms 136 and 146 of the front and rear tabs 130 and 131 of the ear 113 by the gap 116, at a vertical dimension GV2. The vertical dimension GV2 is approximately one-quarter the vertical dimension V2. Further, in this way, the flange 114 is vertically offset from the brace 113 such that the top 161 of the flange 114 is above the bottom 121 of the brace 112 and the bottom 162 of the flange 114 is below the bottom 121 of the brace 112. The bottom 121 of the brace 112 is registered approximately halfway down the vertical dimension FV2 from top 161 of the flange 114. The flange 114 also a horizontal dimension FH2 which is approximately one-third the horizontal dimension H2. The living hinge 161 includes two semicircular notches 165 formed into the body 111 at the opposed top 161 and bottom 162 of the flange 114, as well as elongate slits 166 aligned vertically and between the notches 165. In this embodiment of the bracket 110, there are three slits 166; in other embodiments, there are more or less, so long as an installer in the field can bend the flange 114 with respect to the boom 115. The notches 165 and slits 166 are formed entirely though the thickness of the body 111, and as such, define voids or cavities in the body 111 where there is less material, so that the body 111 may be flexed more easily there than at other parts of the body 111. The broken line identifies the living hinge 160 connecting the flange 114 to the back 151 of the boom 115.

Both the brace 112 and the flange 114 carry bore patterns 168 and 169 so that the bracket 110 may be applied to a joist and to the side wall. The bore pattern 168 in the brace 112 includes thin elongate slots and small circular holes. The brace 112 has two horizontal slots 170 and 171 vertically registered with each other. The slots 170 and 171 are each slender and aligned between the front 122 and back 123 of the brace 112. The slot 170 is registered above the slot 171; the slot 170 is aligned slightly higher than the bottom of the ear 113. A hole pattern 172 includes eleven circular holes 173 formed in an array through the brace 112: three holes 173 are spaced apart from each other above the slot 170, four holes 173 are spaced apart from each other between the slots 170 and 171, and three holes 173 are spaced apart from each other below the slot 171. In other embodiments, a lesser or greater number of holes may be formed through the bracket 110 as is necessary to carry the rated load.

In the flange 114, the bore pattern 169 includes a wider elongate slot 174 and larger circular holes 175. The slot 174 is aligned vertically, parallel and proximate to the back 164 of the flange 114. One holes 175 each is disposed directly above and below the slot 174, and five holes 175 are spaced apart from each other in front of the slot 174. The slot 174 is axially longer and wider than the slots 170, and the holes 175 have larger diameters than do the holes 173. The larger slot 174 and holes 175 are useful to accommodate larger fasteners to securing the bracket 110 to masonry such as a pool wall than are necessary to secure the bracket 110 to a joist 84.

As will be explained in greater detail with respect to a similar embodiment, the bracket 110 is installed against a vertical surface, such as the pool wall 81, so that a joist 84 can be hung in an offset fashion to that vertical surface, generally at approximately ninety degrees to the vertical surface, though not always. The bracket 110 provides some flexibility in adjustment of horizontal angular orientation with respect to the vertical surface. The bracket 110 further provides flexibility in installing both the bracket 110 to the vertical surface and the joist to the bracket 110. The slots 170, 171, and 174 allow installers to set the bracket 110 to the vertical surface and joist and then adjust the horizontal or vertical registration of the bracket 110 within a range. A living hinge or bend line 126 is shown proximate the back 123 of the brace 112; the bend line 126 is a pre-defined bend or hinge point, a vertical section of the brace 112 at which the bracket 110 can be bent to set the brace 112 at an angle with respect to the flange 114 and the boom 115. The bend line 126 extends vertically through the entirety of the brace 112, from the top 120 to the bottom 121. This bend line 126 allows the bracket 110 to set joists 184 at extreme angles with respect to the pool wall 81, such as at points 85 around the pool 80.

Figure 4:
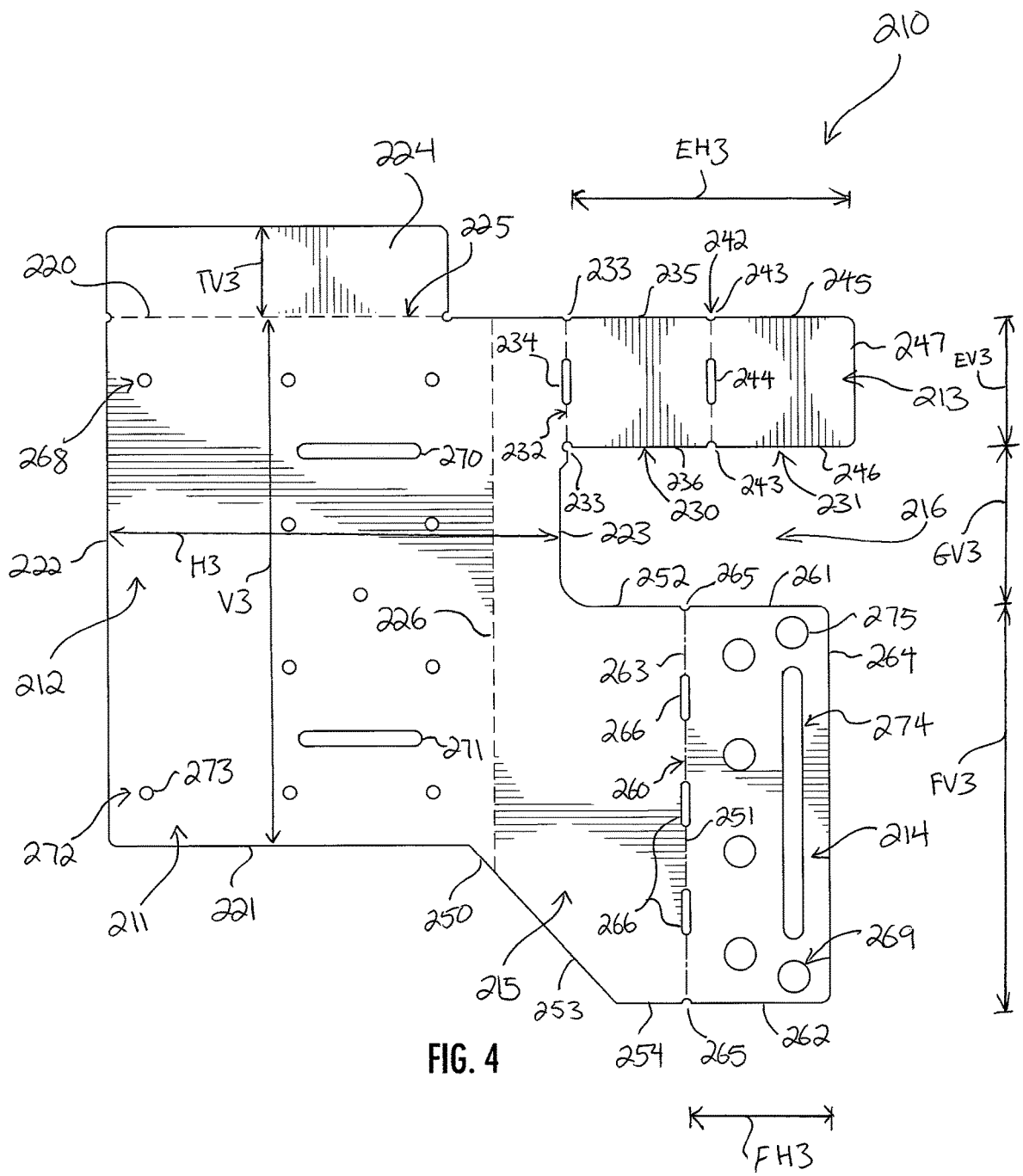

FIG. 4 is an elevation view of an offset bracket 210 for supporting joists of a deck frame assembly. FIG. 4 illustrates the bracket 210 in a flat, stamped configuration, as it would appear just after fabrication and before it has been bent into shape for use in the deck frame assembly. The bracket 210 is identical to the bracket 10 in almost every respect but for some structural differences. As such, the naming convention used to describe and identify the various structural elements and features of the bracket 10 are adopted and used to describe and identify the various structural elements and features, but with a slight modification: the reference characters of elements and features of the bracket 210 have a prefix "2" in the hundreds place. For instance, while the bracket 10 includes a body 11, a brace 12, an ear 13, etc., the bracket 210 includes a body 211, a brace 212, and an ear 213. This modification avoids confusion between the structural elements and features of the different bracket embodiments. Further, for brevity, since the structural elements and features of the brackets 10 and 110 have already been detailed, identical structural elements and features of the bracket 210 will not be described but will only be listed and distinguished by their hundreds-place prefix. Where the bracket 210 possess structural elements and features which are different from those of the brackets 10 or 110, however, such differences are explained.

The bracket 210 includes a body 211, a brace 212, an ear 213, a mounting flange 214, a boom 215, and a gap 216. The brace 212 of the bracket 210 includes a top 220, a bottom 221, a front 222, and a back 222. The brace 212 has a horizontal dimension H3 and a vertical dimension V3 which is approximately ten percent larger than the horizontal dimension H3. The brace 212 also includes a tab 224, but unlike the tab 124 of the bracket 110, the tab 224 is formed integrally to the top 220 of the brace 212 and extends along the top 220 from the front 222 to just short of the back 223. The tab 224 is formed to the top 220 along a living hinge or bend 225 identified in FIG. 4 with a broken line. The bend 225 is a pre-defined bend or hinge point which is bent to a desired orientation (typically ninety degrees) during installation of the bracket 210. Generally, though, the tab 224 projects laterally outward from the brace 212 and supports the upper flange of the joist 84. The tab 224 may be bent either to the left or right of the brace 212 (in FIG. 4, left and right correspond to into and out of the page). The tab 224 has a vertical dimension TV3 which is approximately two-tenths the vertical dimension V3.

The ear 213 of the bracket 210 includes a front tab 230, a rear tab 231, a living hinge 232, notches 233, a slit 234, a living hinge 242, notches 243, and a slit 244. Like the ear 13 in the bracket 10, the ear 213 in the bracket 210 has a continuous top: the top 235 of the front tab 230 is aligned with the top 245 of the rear tab 231 which is aligned with the top 220 of the brace 212, and all are contiguous with each other but for the notches 233 and 243. Moreover, the bottoms 236 and 246 of the front and rear tabs 230 and 231 are aligned and contiguous, but for the notch 243. However, in other embodiments, and after reading the description of the ear 113 of the bracket 110, one having ordinary skill in the art would understand that the ear 213 of the bracket 210 could have a rear tab 231 with a top 245 that is elevated or projects with respect to the top 235 of the front tab 230. The ear 213 has a horizontal dimension EH3 which is approximately three-quarters the horizontal dimension H3 and a vertical dimension EV3 which is approximately one-quarter the vertical dimension V3.

The boom 215 of the bracket 210 includes a front 250, a back 251, a top 252, a diagonal 253, and a bottom 254. The flange 214 includes a living hinge 260, a top 261, a bottom 262, a front 263, a bottom 264, notches 265, slits 266, bore patterns 268 and 269, slots 270 and 271, a hole pattern 272, holes 273, a slot 274, and holes 275. The living hinge 260 is registered between the living hinges 232 and 242 of the ear 213, such that the flange 214 bends at an offset location with respect to ear 213. The flange 214 has a vertical dimension FV3 which is approximately three-quarters the vertical dimension V3. The top 261 of the flange 214—and the top 252 of the boom 215—is set apart from the bottoms 236 and 246 of the front and rear tabs 230 and 231 of the ear 213 by the gap 216, at a vertical dimension GV3. The vertical dimension GV3 is approximately one-third the vertical dimension V3. Further, in this way, the flange 214 is vertically offset from the brace 213 such that the top 261 of the flange 214 is above the bottom 221 of the brace 212 and the bottom 262 of the flange 214 is below the bottom 221 of the brace 212. The bottom 221 of the brace 212 is registered approximately halfway down the vertical dimension FV3 from top 261 of the flange 214. The flange 214 also a horizontal dimension FH3 which is approximately one-third the horizontal dimension H3. The bracket 210 is installed against a vertical surface, such as a pool wall 81, so that a joist 84 can be hung in an offset fashion to that vertical surface, generally at approximately ninety degrees to the vertical surface, though not always. The bracket 210 provides some flexibility in adjustment of horizontal angular orientation with respect to the vertical surface. The bracket 210 further provides flexibility in installing both the bracket 210 to the vertical surface and the joist to the bracket 210. The slots 270, 271, and 274 allow installers to set the bracket 210 to the vertical surface and joist and then adjust the horizontal or vertical registration of the bracket 210 within a range. A living hinge or bend line 226 is shown proximate the back 223 of the brace 212; the bend line 226 is a pre-defined bend or hinge point, a vertical section of the brace 212 at which the bracket 210 can be bent to set the brace 212 at an angle with respect to the flange 214 and the boom 215. The bend line 226 extends vertically through the entirety of the brace 212, from the top 220 to the bottom 221. This bend line 226 allows the bracket 210 to set joists 84 at extreme angles with respect to the pool wall 81, such as at points 85 around the pool 80.

Figure 5:
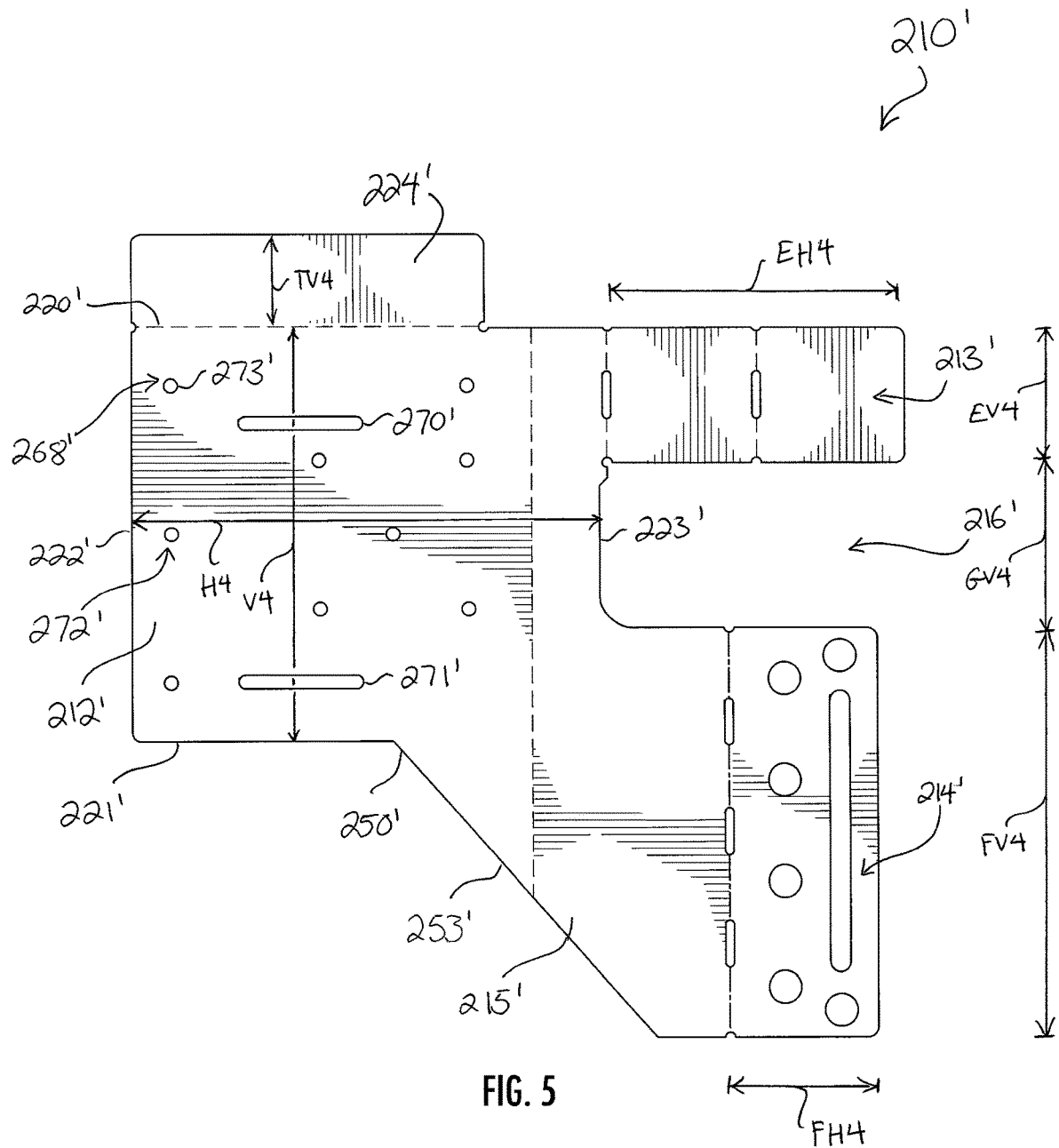

FIG. 5 is an elevation view of an offset bracket 210' for supporting joists 84 of a deck frame assembly. FIG. 5 illustrates the bracket 210' in a flat, stamped configuration, as it would appear just after fabrication and before it has been bent into shape for use in the deck frame assembly. The bracket 210' is identical to the bracket 210 in every respect but for one: the height of the brace 212' and the commensurate length of the diagonal 253'. As such, the naming convention used to describe and identify the various structural elements and features of the bracket 210 is adopted and used to describe and identify the same various structural elements and features, but with a slight modification: the reference characters of elements and features of the bracket 210' are marked with a prime ("'") symbol. For instance, while the bracket 210 includes a body 211, a brace 212, an ear 213, etc., the bracket 210' includes a body 211', a brace 212', and an ear 213'. This modification avoids confusion between the structural elements and features of the different bracket embodiments. Further, for brevity, since the structural elements and features of the bracket 210 have already been detailed, identical structural elements and features of the bracket 210' will not be described or listed. Rather, only the differences between the brackets 210 and 210' are described. Not all of the reference characters used to identify the structural elements and features are shown in FIG. 5.

The bracket 210' is designed to support a smaller joist than the bracket 210. For instance, the bracket 210 could support an eight-inch tall joist, while the bracket 210' is designed to support a six-inch tall joist. As such, less material in the brace 212' is used. The distance between the top 220' and the bottom 221' of the brace 212' is shorter than the distance between the top 220 and the bottom 221 of the brace 212. Consequently, the diagonal 253' of the boom 215' is much longer than the diagonal 253 of the boom 215, and the front 250' of the boom 215' is further forward with respect to the front 222' of the brace 212' than is the front 250 of the boom 215 with respect to the front 222 of the brace 212. Further, there is less room for the bore pattern 268'. As such, the slots 270' and 271' are closer together and forward of the corresponding positions of the slots 270 and 271 in the brace 212, and there are only nine holes 273' in the hole pattern 272'.

Since the bracket 210' modifies the shape of the bracket 210, dimensions will be reviewed. The brace 212' has a vertical dimension V4 and a horizontal dimension H4 which is approximately ten percent larger than the vertical dimension V4. The tab 224' has a vertical dimension TV4 which is approximately two-tenths the vertical dimension V4. The ear 213' has a vertical dimension EV4 which is approximately one-third the vertical dimension V4 and a horizontal dimension EH4 which is approximately two-thirds the horizontal dimension H4. The gap 216' has a vertical dimension GV4 which is approximately four-tenths the vertical dimension V4. The flange 214' has a vertical dimension FV4 which is approximately equal to the vertical dimension V4 of the brace 212', and it has a horizontal dimension FH4 which is approximately one-third the horizontal dimension H4.

Figure 6:
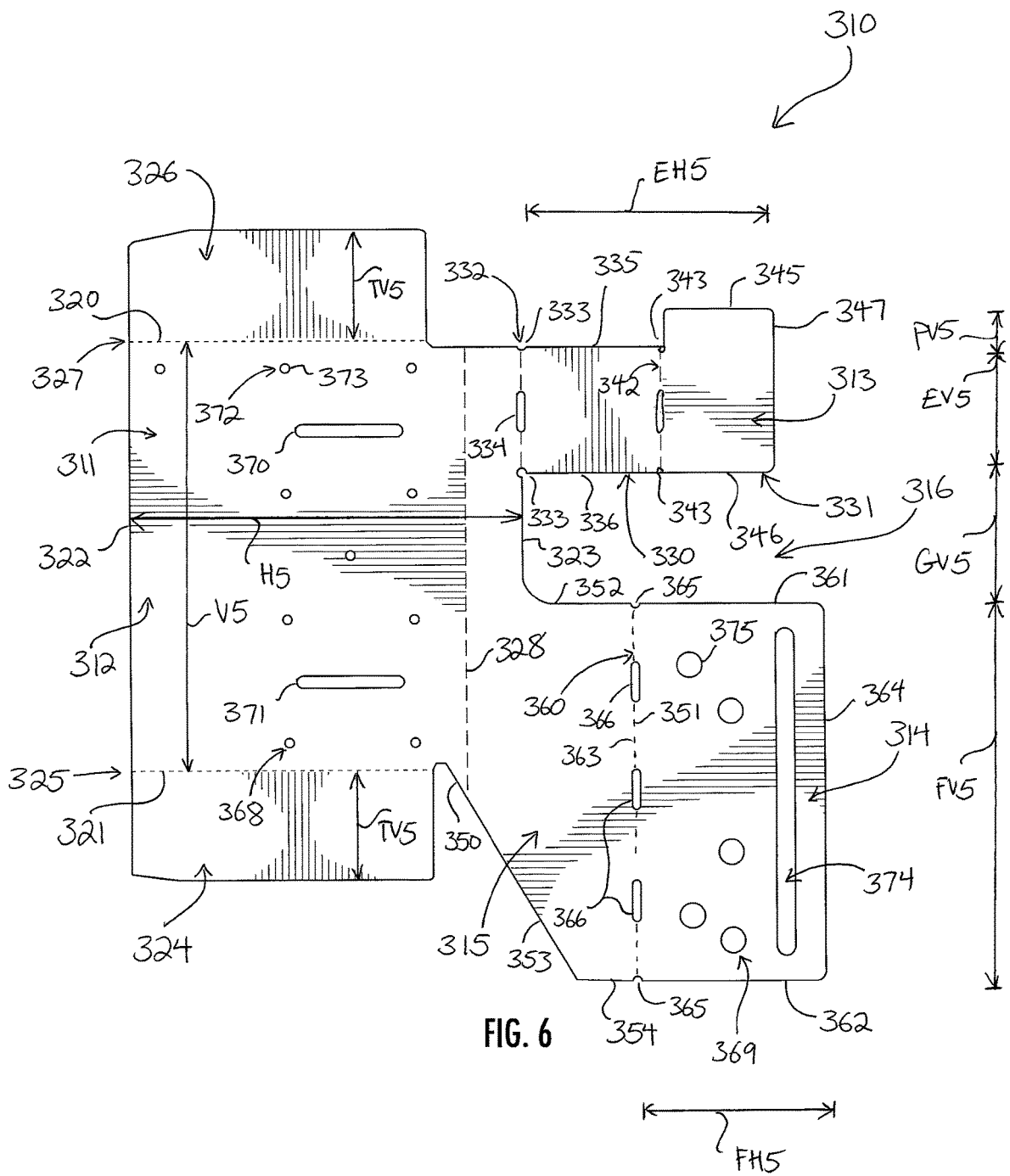

FIG. 6 is an elevation view of an offset bracket 310 for supporting joists of a deck frame assembly. FIG. 6 illustrates the bracket 310 in a flat, stamped configuration, as it would appear just after fabrication and before it has been bent into shape for use in the deck frame assembly. The bracket 310 is identical to the bracket 210 in almost every respect but for some structural differences. As such, the naming convention used to describe and identify the various structural elements and features of the bracket 10 are adopted and used to describe and identify the various structural elements and features, but with a slight modification: the reference characters of elements and features of the bracket 310 have a prefix "3" in the hundreds place. For instance, while the bracket 210 includes a body 211, a brace 212, an ear 213, etc., the bracket 310 includes a body 311, a brace 312, and an ear 313. This modification avoids confusion between the structural elements and features of the different bracket embodiments. Further, for brevity, since the structural elements and features of the bracket 210 have already been detailed, identical structural elements and features of the bracket 310 will not be described but will only be listed. Many reference characters are not placed on FIG. 6 for clarity of the illustration, the same reference characters (but for the modified prefix) having already been identified with respect to the bracket 210 in FIG. 4. Where the bracket 310 possess structural elements and features which are different from those of the bracket 210, such differences are explained.

The bracket 310 includes a body 311, a brace 312, an ear 313, a mounting flange 314, a boom 315, and a gap 316. The brace 312 of the bracket 310 includes a top 320, a bottom 321, a front 322, and a back 322. The brace 312 has a horizontal dimension H5 and a vertical dimension V5 which is approximately twenty-five percent larger than the horizontal dimension H5. The brace 312 also includes two rigid tabs 324 and 326 extending from the top 320 and the bottom 321 of the brace 312, respectively. The tabs 324 and 326 are of the same vertical dimension TV5, which is approximately two-tenths the vertical dimension V5.

The tab 324 is formed integrally to the bottom 321 of the brace 312 and extends along the bottom 321 from the front 322 to the back 323. The tab 324 is formed to the bottom 321 along a bend 325 identified in FIG. 6 with a broken line. The bend 325 is a pre-defined bend or hinge point which is bent to a desired orientation (typically ninety degrees) during installation of the bracket 310. Generally, when installed, the tab 324 projects laterally outward from the brace 312 and supports the lower flange of the joist 84. The tab 324 may be bent either to the left or right of the brace 312 (in FIG. 6, left and right correspond to into and out of the page).

Similarly, the tab 326 is formed integrally to the top 320 of the brace 312 and extends along the top 320 from the front 322 to just short of the back 323. The tab 326 is formed to the top 320 along a living hinge or bend 327 identified in FIG. 6 with a broken line. The bend 327 is a pre-defined bend or hinge point which is bent to a desired orientation (typically ninety degrees) during installation of the bracket 310. The tab 326 thus projects laterally outward from the brace 312 when installed, and it supports the upper flange of the joist 84. The tab 326 may be bent either to the left or right of the brace 312. Because the tabs 324 and 326 are both quite rigid, they generally are pre-bent by the manufacturer, and, in some embodiments, even include gussets to increase their rigidity. The tabs 324 and 326 are helpful when hanging a joist 84 on the bracket 310; the rigid tabs 324 and 326 maintain the correct elevation of the joist 84, especially with respect to the ear 313.

The ear 313 of the bracket 310 includes a front tab 330, a rear tab 331, a living hinge 332, notches 333, a slit 334, a top 335, a bottom 336, a living hinge 342, notches 343, a slit 344, and a top 345, bottom 346, and back 347. The rear tab 331 is similar to the rear tab 131 of the bracket 110; the top 345 of the rear tab 331 projects above the top 335 of the front tab 330. The rear tab 331 thus has a height which is greater than its width. The ear 313 has a horizontal dimension EH5 which is approximately six-tenths the horizontal dimension H5, and the front tab 330 has a vertical dimension EV5 which is approximately one-quarter the vertical dimension V5. The rear tab 331 projects approximately three-tenths the vertical dimension EV5 above the front tab 330. The increased height of the rear tab 331 allows an installer to ensure that, when hanging a joist 84 on the bracket 310, the correct elevation of the joist 84 on the bracket 310 is maintained; the top 345 of the rear tab 331 is level with the top of the joist 84 once hung, which helps keep the decking planks flush and level with the pool deck 82. However, in other embodiments, one having ordinary skill in the art would understand that the ear 313 of the bracket 310 could have a rear tab 331 with a top 345 aligned with and continuous to the top 335 of the front tab 330. Like the bracket 210, the top 335 of the front tab 330 is aligned with and contiguous with the top 320 of the brace 312.

The boom 315 of the bracket 310 includes a front 350, a back 351, a top 352, a diagonal 353, and a bottom 354. The flange 314 includes a living hinge 360, a top 361, a bottom 362, a front 363, a back 364, notches 365, slits 366, slots 370 and 371, a hole pattern 372, holes 373, a slot 374, and holes 375. The living hinge 360 is registered between the living hinges 332 and 342 of the ear 313, such that the flange 314 bends at an offset location with respect to ear 313. The flange 314 has a vertical dimension FV5 which is approximately eight-tenths the vertical dimension V5. The top 361 of the flange 314—and the top 352 of the boom 315—is set apart from the bottoms 336 and 346 of the front and rear tabs 330 and 331 of the ear 313 by the gap 316, at a vertical dimension GV5. The vertical dimension GV5 is approximately one-quarter the vertical dimension V5. Further, in this way, the flange 314 is vertically offset from the brace 313 such that the top 361 of the flange 314 is above the bottom 321 of the brace 312 and the bottom 362 of the flange 314 is below the bottom 321 of the brace 312. The bottom 321 of the brace 312 is registered approximately halfway down the vertical dimension FV5 from top 361 of the flange 314. The flange 314 also a horizontal dimension FH5 which is approximately one-half the horizontal dimension H5.

The holes 375 are grouped in a different pattern than in other embodiments of the bracket: there are two upper holes 375 grouped together and three lower holes 375 grouped together. The bracket 310 is installed against a vertical surface, such as a pool wall 81, so that a joist 84 can be hung in an offset fashion to that vertical surface, generally at approximately ninety degrees to the vertical surface, though not always. The bracket 310 provides some flexibility in adjustment of horizontal angular orientation with respect to the vertical surface. The bracket 310 further provides flexibility in installing both the bracket 310 to the vertical surface and the joist to the bracket 310. The slots 370, 371, and 374 allow installers to set the bracket 310 to the vertical surface and joist and then adjust the horizontal or vertical registration of the bracket 310 within a range. A living hinge or bend line 328 is shown proximate the back 323 of the brace 312; the bend line 328 is a pre-defined bend or hinge point, a vertical section of the brace 312 at which the bracket 310 can be bent to set the brace 312 at an angle with respect to the flange 314 and the boom 315. The bend line 328 extends vertically through the entirety of the brace 312, from the top 320 to the bottom 321. This bend line 328 allows the bracket 310 to set joists 84 at extreme angles with respect to the pool wall 81, such as at points 85 around the pool 80.

The above describes several different embodiments of brackets. The ensuing description will be with reference to two brackets, the bracket 10 and the bracket 110. The only differences between these brackets are the additional tab 124 and the taller rear tab 131 on the bracket 110.

Turning now to FIGS. 2A-2D, installation of the brackets 10 and 110 is shown. FIG. 2A shows a plan view of the exemplary pool 80 with beams 83 and joists 84 laid out. As hinted earlier, it is noted that when a pool edge is irregular, such as shown in FIG. 2A, the flange 14 of the bracket 10 is rarely oriented at ninety degrees to the brace 12; in most cases, the flange 14 is at some other angle. Some of those angles are quite small, such as where a joist 84 is very close to the wall 81 and nearly parallel to it. In FIG. 2A, points 85 identify such locations where the angle between the flange 14 and the brace 12 of the brackets 10 are small. The brace 112 of the bracket 110 must extend out beyond the overhanging pool edge 86 so that the decking planks atop the joists 84 can be attached above the brace 112 flush with the pool deck, but at locations such as these, the brace 12 does not always have sufficient length to clear the overhanging lip when only the living hinge 60 is bent. The bend line 24 accommodates this issue. By bending the bracket 10 along the bend line 24, generally less than forty-five degrees and preferably at approximately thirty degrees, the brace 12 is re-oriented and can clear the overhanging pool edge 86. The extent of this bend can be made in the shop during manufacture, and is customized for each joist 84 as necessary. As explained above, the bend line 24 is incorporated into each of the brackets, though most brackets do not require them, and many pool installations do not require them at all. Where they are not required, the brace 12 is simply left "un-bent," with the bend line 24 not flexed. Where the low angle must be accommodated, however, incorporating the bend line 24 into the bracket 10 is beneficial.

First, FIG. 2B illustrates two brackets 10, both secured to the pool wall 81, one supporting a joist 84, one not. The joist 84 is conventional, having a long web 90 between an upper flange 91 and an opposed lower flange 92. There are two methods for securing the bracket 110, the joist 84, and the wall 81. Both are described below. The process will be described with respect to installation of a deck over a pool, but is applicable to other types of framing installations. In a first installation method, the bracket is first applied to the joist and then to the wall. In a second method, the bracket is first applied to the wall, and then the joist is applied to the bracket.

With the first method of installation, a few major beams 83 are hung across a pool 80, as shown in FIG. 2A. The beams 83 are typically sistered beams, such as a pair of 2×8s, 2×10s, or 2×12s, though other sizes and combinations of beams can be used. Un-cut joists 84 are then laid out over the pool 80, spanning from one side of the pool deck 82 to the other and supported at their ends by the deck. The proper spacing of the joists 84 is determined, and the location of each end is marked so that a bracket 10 can be installed in that location. The ear 13 and the flange 14 of the bracket 10 are then bent to approximately the angles needed. Because the ear 13 and the flange 14 and boom 15 are separated by the gap 16, the ear 13 and the flange 14 are independently poseable with respect to the brace 12; each can be bent and manipulated without affecting the other and without affecting the brace 12. The flange 14 is sometimes oriented approximately ninety degrees to the brace 12, but is often a different angle to accommodate an irregularly shaped wall or other surface to which the bracket 10 is attached. FIG. 2B shows an orientation in which the flange 14 is approximately ninety degrees to the brace 12. FIG. 2B also shows the ear 13 bent ninety degrees in the other direction, thus spaced apart from the pool wall 81 and the pool edge 86 for later positioning. With the location of the brackets 10 marked, a template is used to mark drilling locations into the wall 81.

The bracket 10 is then applied to the wall 81. The bracket 10 is positioned so that the ear 13 is proximate to the edge 86 and the flange 14 is proximate to the wall 81 below the edge 86, with the gap 16 spaced over the transition from the edge 86 to the wall 81. So located, the bracket 10 is then secured to the wall 81 by using a strong fastener, such as a masonry screw or nail, and driving it through the vertical slot 74 and into the pool wall 81. The fastener is generally not fully driven, thereby allowing some vertical play of the bracket 10 on the fastener. This lets the installers move the bracket 10 up and down with the fastener in the slot 74, so as to make fine adjustments to the height of the bracket 10. FIG. 2B shows two brackets 10 applied to the wall 81 in this manner. FIG. 2B also shows two fasteners in the slot 74; frequently one fastener is driven through the slot 74 near its bottom, which allows the bracket 10 to hang on the fastener and be adjusted vertically.

All of the brackets 10 are applied to the wall 81 in this manner. Each joist 84 can then be set into a pair of opposed brackets 10. The joist 84 is measured and cut to length. The joist 84 is then lifted onto the brackets 10. The joist 84 is typically pivoted into place: the open side of the joist 84 is placed over the bracket 10 by tilting the joist 84 and hanging the upper flange 91 on the bracket 10.

With the joist 84 loosely fit on opposed brackets 10, the installer laterally adjusts the joist 84 so that it is centered between the brackets 10. The installer then typically clamps the joist 84 to the bracket 10 and drives fasteners, such as sheet metal screws, though the holes 73 and the web 90. In embodiments with tabs, such as the bracket 110 and its tab 124, the installer will bend and clamp the tab 124 to the lower flange of the joist 84 before driving fasteners through the bracket 110 and into the joist 84. By clamping the tab 124 to the joist 84, the bracket 110 is held in a correct angle of alignment, at the correct elevation, and at the correct depth of penetration along the length of the joist 84. In an embodiment such as the bracket 210, the tab 224 extending from the top 220 of the brace 212 is used similarly; the tab 224 is clamped to the upper flange of the joist 84 to ensure correct alignment, elevation, and depth. In embodiments such as the bracket 310, either or both of the tabs 324 or 326 may be used in this fashion. In some installation procedures, the installer will first loosely drive fasteners through the horizontal slots 70 and 71 and the web 90 to securely hang the joist 84 on the bracket 10 but allow the bracket 10 to be moved laterally, with the fasteners sliding within the slots 70 and 71. The installers also adjust the brackets 10, bending the front and rear tabs 30 and 31 of the brackets 10, so that the rear tab 31 is spaced apart from the edge 86. The installers then drive fasteners through the holes 73 in the flange 14 to fix the brackets 10 to the wall 81.

With the second method of installation, the un-cut joists 84 are laid out over the pool, spanning from one side of the pool deck 82 to the other and supported at their ends by the deck 82. The proper spacing of the joists 84 is determined, and the location of each end is marked. Without applying the brackets 10 to anything, the ear 13 and the flange 14 of the brackets 10 are bent to approximately the angle needed: the flange 14 is typically oriented to match the approximately angle of the curved wall. The joists 84 are then cut to length.

Next, two brackets 10 are loosely applied to each joist 84. Fasteners are driven through the slots 70 and 71 and the web 90 to secure the brackets 10 on the joist 84 but allow the brackets 10 to be moved laterally. With the brackets 10 so secured, the joist 84 is lifted close to the height of the pool deck and temporarily held in place. In some cases, a tool will be used to hold the joist 84 near the deck while the installers set the brackets 10 to the wall 81; in other cases, scaffolding or installers will hold the joist 84. The ends of the joist 84 carrying the brackets 10 are then brought to their marked positions, as identified earlier. The installers loosely drive fasteners through the slot 74 and the wall 81, thereby loosely applying the brackets 110 to the wall 81. With the brackets 10 loosely fit to the wall 81, and the joist 84 loosely set in the brackets 10, the brackets 10 and joist 84 can be fixed to the wall 81 and secured.

The installers bend the front and rear tabs 30 and 31 of the brackets 10, so that the rear tab 31 is proximate to the wall 81, at the overhanging lip. The two living hinges 32 and 42 are adjusted to set the distance of the rear tab 31 from the edge 86 and also to adjust the angle of the rear tab 31. The installers then move the brackets 10 to their desired heights and drive fasteners through the holes 75 in the flange 14 and into the wall 81, which firmly secures the brackets 10 against the wall 81.

To complete the framework, perimeter supports 93 are installed around the pool deck edge, as shown in FIG. 2C (FIG. 2C also shows a different bracket 110 rather than the bracket 10; this is to show that the installation methods are the same, and reference will now be to the bracket 110). The perimeter supports 93 are angled strips which are cut and bent to correspond to the curvature of the pool deck edge. Fasteners are driven through the perimeter supports 93 into the rear tab 131. These perimeter supports 93 provide support for the ends of decking planks which are laid and secured onto the joists 84 and perimeter supports 93. Decking planks 94 are laid over the joists 84, as shown in FIG. 2D, before they are cut to size. A circular saw or other cutting implement is then moved over the planks 94, at the edge of the deck 82, following the contour of the pool edge 86. This ensures that each plank 94 is custom cut to size. Once the planks 94 are trimmed to size and shape, the joists 84 can be lowered to check their fit. Then, the installers adjust the lateral registration of the joist 84 between the brackets 110, driving fasteners through the holes 173 to fix the joist 84 to the brackets 110. With proper fit and elevation ensured, the joists 84 are now fully secured to the brackets 110.

Figure 7A:
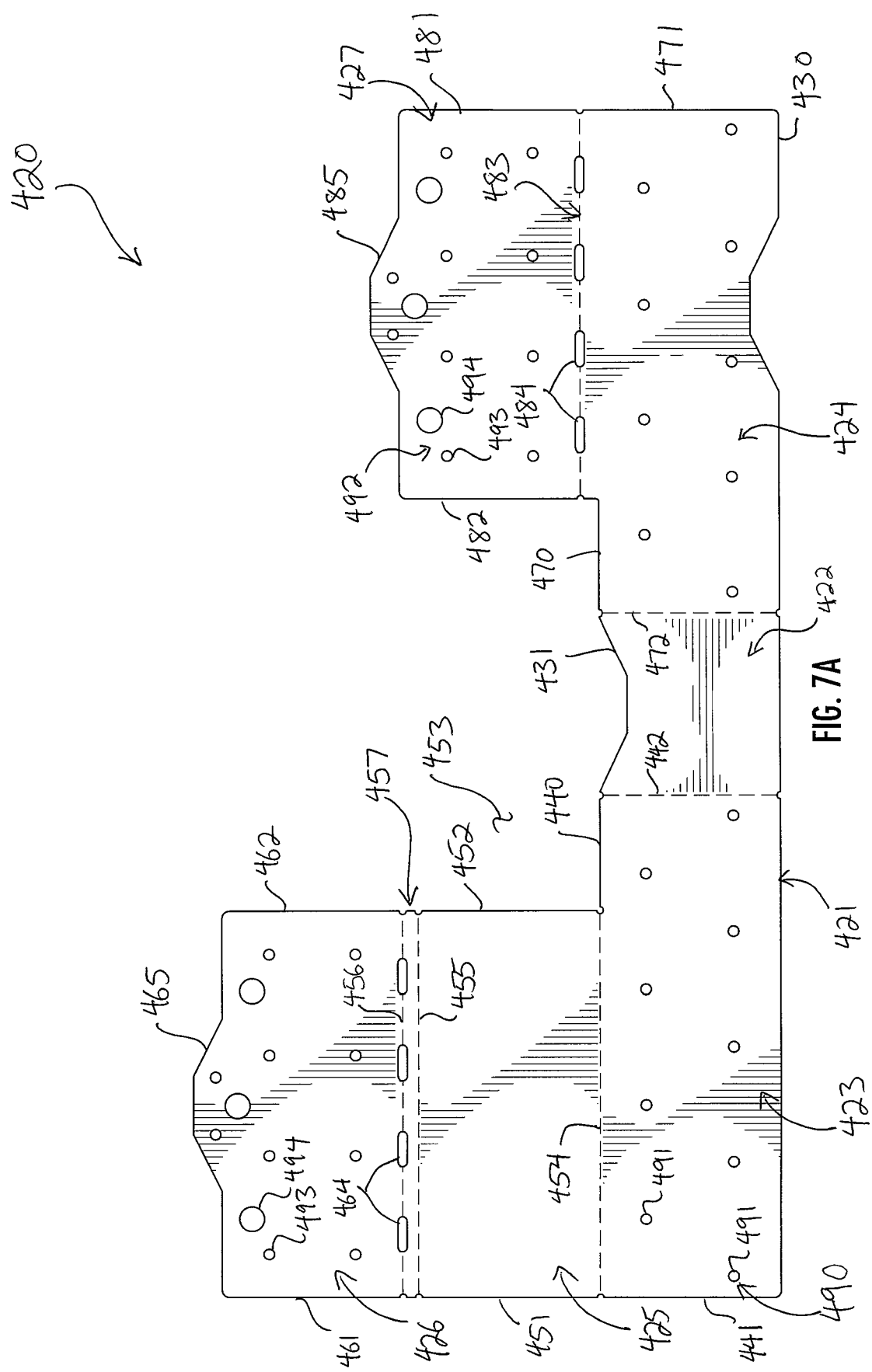
FIGS. 7A, 7B, and 7C are elevation, perspective, and perspective views, respectively, of an embodiment of a bracket for supporting beams.
Figure 7B:
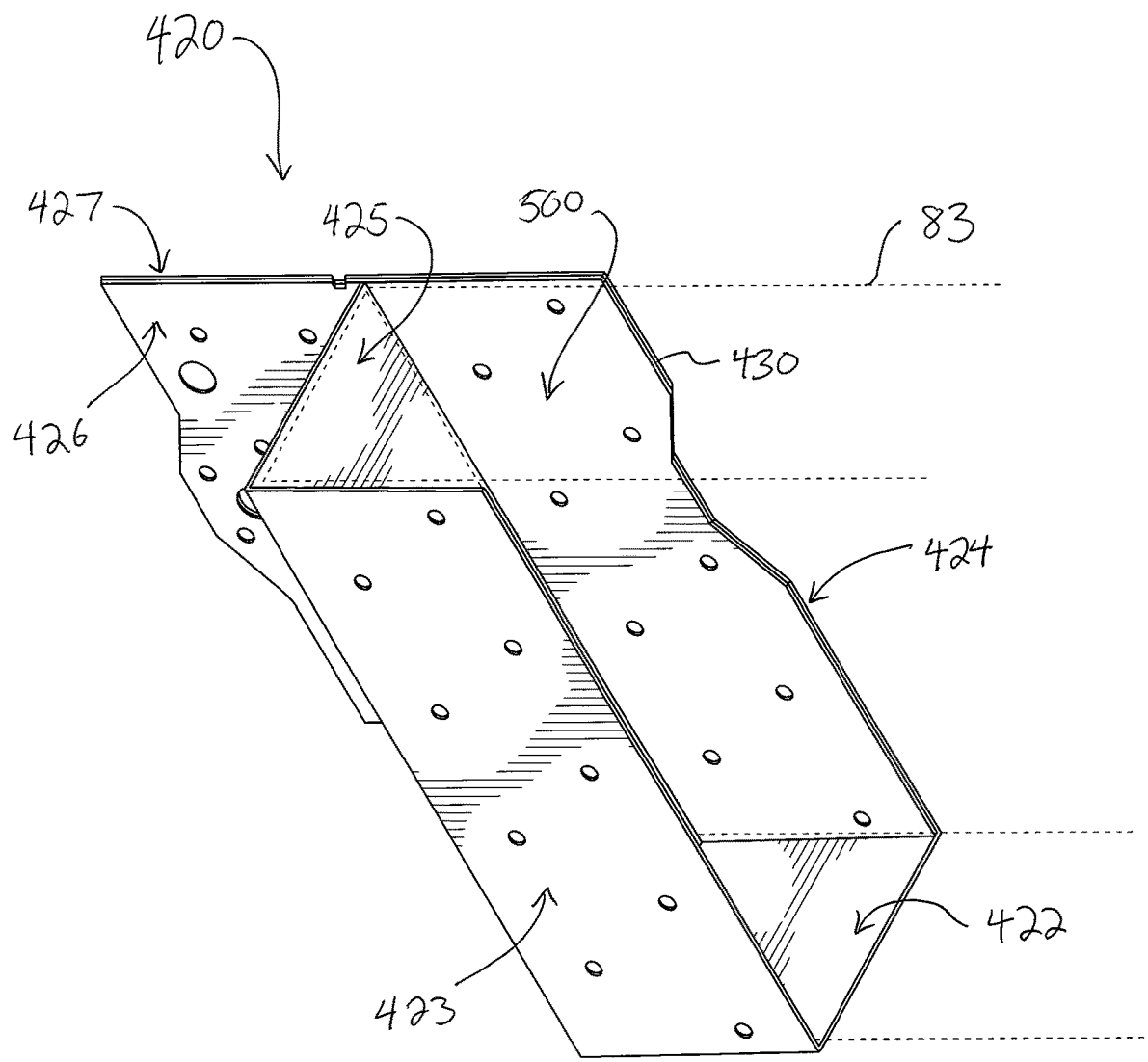
Figure 7C:
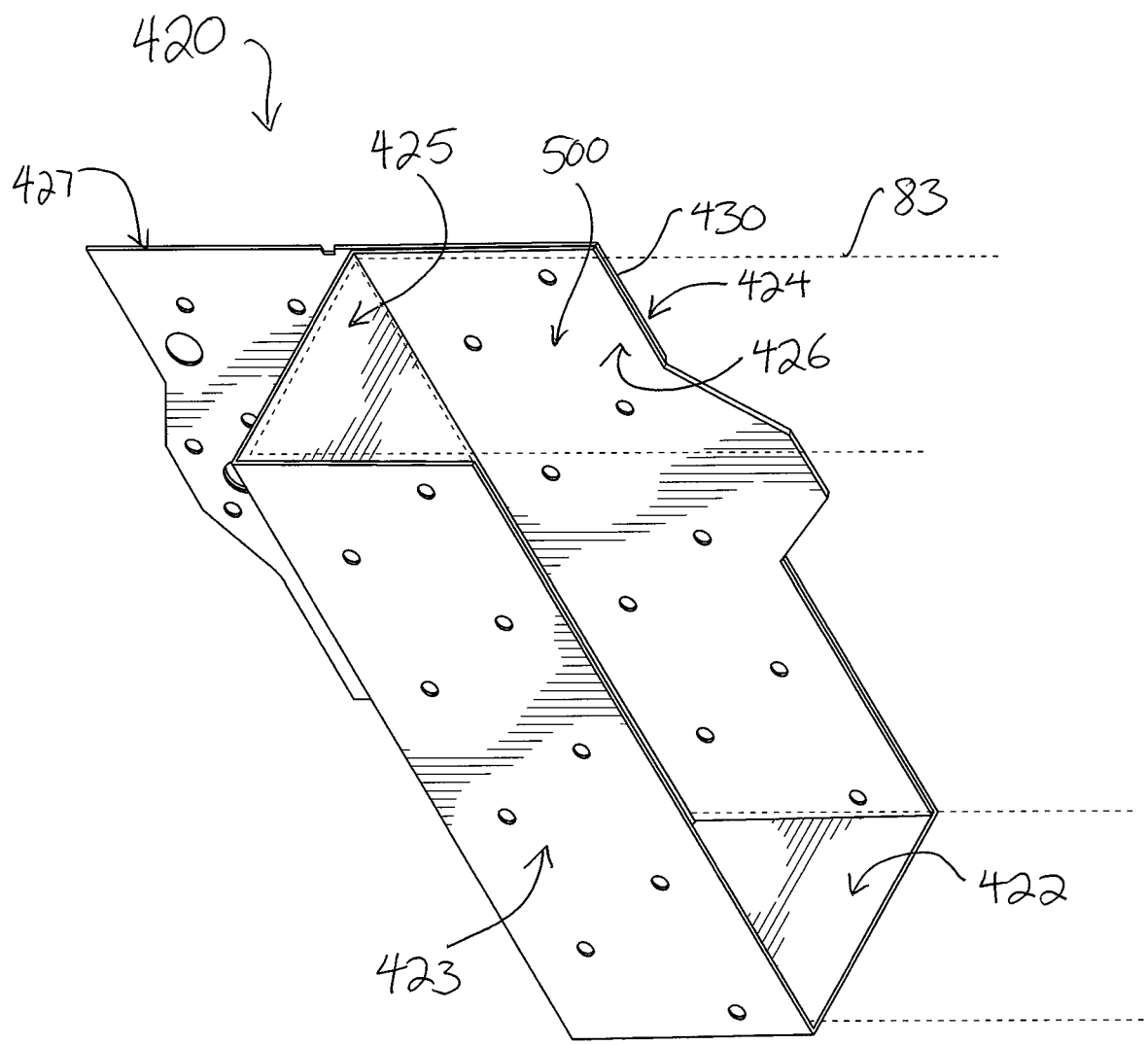

FIG. 7A illustrates an embodiment of a bracket 420. The bracket 420 is shown in a flat, stamped configuration. FIGS. 7B and 7C show the bracket 420 in a front perspective view, as it would appear after manufacture and initial bending in two different configurations, so that it is ready for use and application in framing. The bracket 420 includes a thin body 421 having a bottom panel 422, a left panel 423, a right panel 424, a back panel 425, a left tab 426, and a right tab 427. The body 421 is unitary: the bottom panel 422, left panel 423, right panel 424, back panel 425, left tab 426, and right tab 427 are integrally and monolithically formed as a single piece, preferably constructed of a material having very good rigidity, shear strength, durability, and anti-corrosion properties, such as galvanized steel. The body 421 is thin between its opposed surfaces.

The bracket 420 has a front edge 430 extending entirely along the left panel 423, the bottom panel 422, and the right panel 424. The bottom panel 422 of the bracket 420 extends rearward from this front edge 430 to define a flat lower support surface for a beam (or two side-by-side beams) applied to the bracket 420. The bottom panel 422 has opposed sides at the left and right panels 423 and 424; the opposed sides are short and parallel to each other. The bottom panel 422 has a rectilinear back edge 431 which defines a cutout or notch extending into the bottom panel 422. The cutout is enables patterned brackets 420 to be stamped out of a single sheet of material and tessellated upon each other; the cutout corresponds to a projection as will be described below.

Extending upward from the bottom panel 422 is the left panel 423. The left panel 423 is a tall panel, having a rectangular shape and bent to a normal orientation with respect to the bottom panel 422. It is noted that these directional or dimensional adjectives, such as "tall" may be read more easily when viewing FIG. 7B or 7C than FIG. 7A. The left panel 423 shares the front edge 430 and has an opposed back 440. Both the front edge 430 and the back 440 extend between a top 441 and opposed bottom 442 of the left panel 423, which are parallel to each other and perpendicular to the front edge 430 and the back 440. The left panel 423 is flat and smooth.

The back panel 425 extends away from the left panel 423 along the back 440. The back panel 425 is also flat and smooth, but is not quite as tall as the left panel 423. The back panel 425 has a top 451, aligned with and contiguous to the top 441 of the left panel 423. But the back panel 425 has an opposed bottom 452, which is disposed above the bottom 442 (and the bottom panel 422) when the bracket 420 is bent to the configuration shown in FIGS. 7B and 7C. Because the back panel 425 is shorter than the left panel 423, it defines a gap 453 between its bottom 452 and the bottom panel 422 of the bracket 420 itself. The back panel 425 is formed to the left panel 423 along a bend 454, shown in broken line in FIG. 7A. The bend 454 is bent by the manufacturer during manufacture, and is preferably bent to a fixed and static angle of ninety degrees between the back panel 425 and the left panel 423.

Opposite the bend 454 is a bend 455, and just beyond that bend 455 is a living hinge 456. The bend 455 and the living hinge 456 define a slender extension 457 of the back panel 425. This extension 457 serves to offset the living hinge 456 slightly. When the bend 455 is bent to approximately ninety degrees, the left tab 426 is offset from the back panel 425; the living hinge 456 is now just slightly behind the back panel 425 rather than flush with the back panel 425.

This offset allows the left and right tabs 426 and 427 to register with each other, as in FIG. 7B. It also allows the left tab 426 through a wider range of angles. When the left tab 426 is offset as described, the heads of the fasteners extending through the holes of the bracket 420 are offset from the bend 455 by a distance more than the width of the back panel 425. As such, the left tab 426 may be adjusted through a range of angles until it is flush against the back panel 425: the heads of the fasteners do not contact the back panel 425 and prevent the left tab 426 from flushing up against the back panel 425.

Behind the extension 457 is the left tab 426. The left tab 426 extends away from the back panel 425 and the extension 457. The left tab 426 has the same height as the back panel 425, and its top 461 and bottom 462 are aligned with and contiguous to the top 451 and bottom 452 of the back panel 425, respectively. The left tab 426 is flat and smooth, and is formed to the back panel 425 along the living hinge 456 extending normal to and between the top 461 and the bottom 462. The living hinge 456 is suitable for being bent by installers in the field, and includes four slits 464 along the living hinge 456. The slits 464 are formed entirely though the thickness of the body 421, and as such, define voids or cavities in the body 421 where there is less material, so that the body 421 may be flexed more easily there than at other parts of the body 421. Opposite the living hinge 456, the left tab 426 has a projection 465 extending outward from the left tab 426, which assists in fastening the bracket 420 to a beam, joist, wall, or other framing element while still allowing the bracket 420 to be bent with respect to such framing element, as will be explained below.

Extending upward from the bottom panel 422 is the right panel 424. The right panel 424 is a tall panel, having a rectangular shape, and bent to a normal orientation with respect to the bottom panel 422. The right panel 424 shares the front edge 430 and has an opposed back 470. Both the front edge 430 and the back 470 extend between a top 471 and opposed bottom 472 of the right panel 424, which are parallel to each other and perpendicular to the front edge 430 and the back 470. The right panel 424 is flat and smooth. A majority portion of the back 470, proximate to the top 471, projects slightly farther away from the right panel 425 than the rest of the back 470. When the back panel 425 is bent and directed toward the right panel 424, the bend 455 between the back panel 425 and the extension 457 is against the back 470 of the right panel 424. When the bend 455 is bent, the living hinge 456 is just behind this, thereby allowing the living hinge 456 to be bent and allowing the fronts of the left and right tabs 426 and 427 be collocated and coextensive.

The right tab 427 extends away from the right panel 424. The right tab 427 is not as tall as the right panel 424 but is coextensive to the left tab 425. Its top 481 is aligned with and contiguous to the top 471 of the right panel 424. Its bottom 482 extends to just short of the bottom 472 of the right panel 424. The right tab 427 is flat and smooth, and is formed to the right panel 424 along a living hinge 483 extending normal to and between the top 481 and the bottom 482. The living hinge 483 is suitable for being bent by installers in the field, and includes four slits 484 along the living hinge 483. The slits 484 are formed entirely though the thickness of the body 421, and as such, define voids or cavities in the body 421 where there is less material, so that the body 421 may be flexed more easily there than at other parts of the body 421. Opposite the living hinge 483, the right tab 427 has a projection 485 extending outward from the right tab 427, which assists in fastening the bracket 420 to a beam, joist, wall, or other framing element while still allowing the bracket 420 to be bent with respect to such framing element, as will be explained below. This projection 485 corresponds in size and shape to the projection 465 of the left tab 465, just as the right tab 427 corresponds in size and shape to the left tab 465.

Hole patterns are formed throughout the bracket 420. In the left and right panels 423 and 424, a hole pattern 490 includes a front row of spaced-apart holes 491 and a back row of spaced-apart holes 491. These holes 491 are small, circular, and suitable for receiving fasteners that secure the bracket 420 and the beam 83 it supports. In the left and right tabs 426 and 427, a hole pattern 492 includes an array of small holes 493 and large holes 494. The hole pattern 492 is identical on the left tab 426 and the right tab 427. There are three large holes 494, proximate to the backs of the left and right tabs 426 and 427, and one of those large holes 494 is partially located in the projections 465 and 485. The small holes 493 are disposed among the large holes 494, with two vertical rows of four small holes 493 in front of the large holes 494, and one row of two small holes 493 behind the large holes 494 in the projections 465 and 485. The small and large holes 493 and 494 in the left and right tabs 426 and 427 are suitable for receiving fasteners that secure the bracket 420 to supporting framing elements.

Figure 9A:
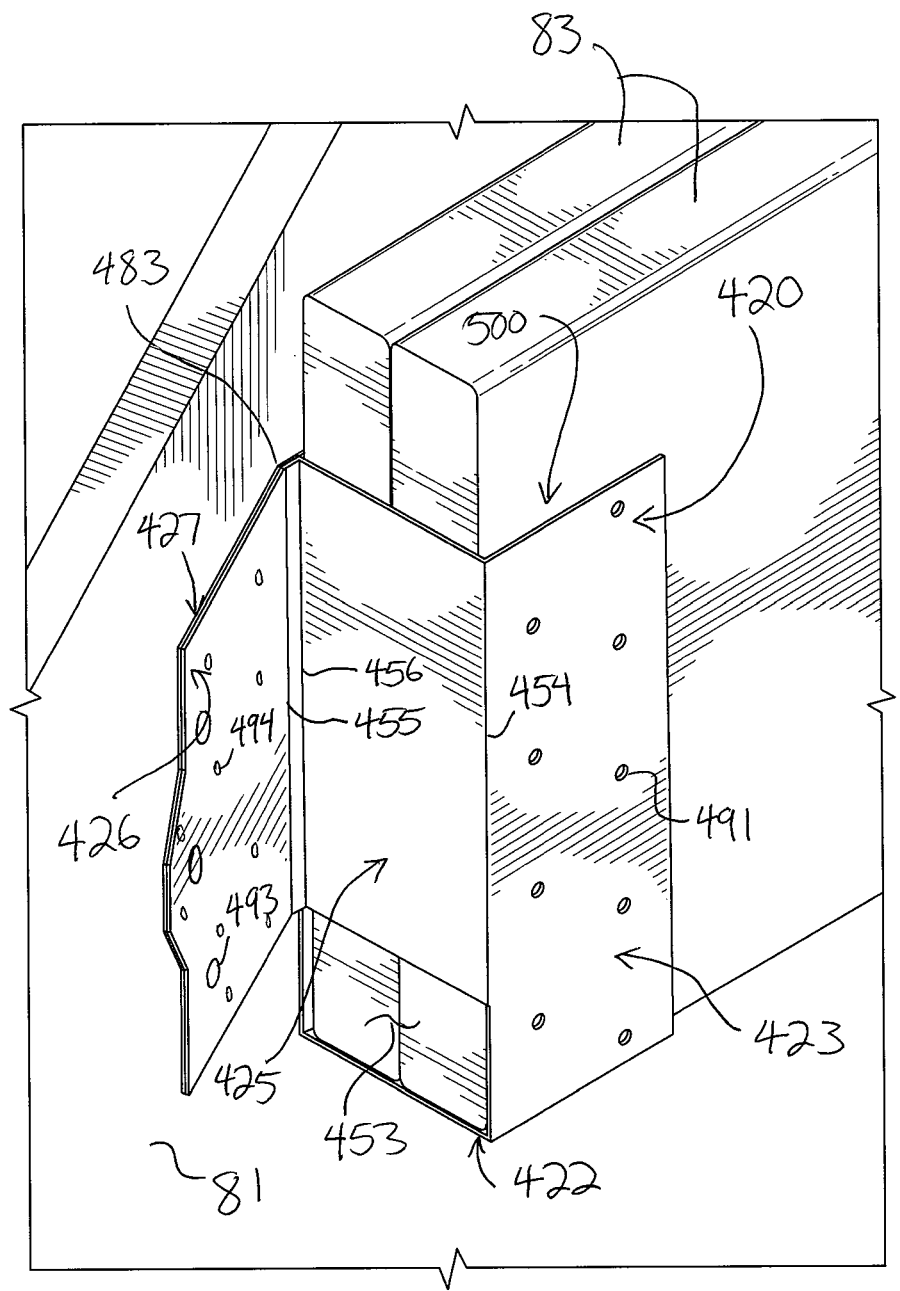
FIGS. 9A and 9B are perspective views illustrating the brackets of FIGS. 7A and 8A in use, respectively.

Turning now to FIGS. 7B, 7C, and 9A, two methods of installation of the bracket 420 will be described. In broken line, FIGS. 7B and 7C illustrates a beam 83 (or set of beams 83) set into the bracket 420. FIG. 9A illustrates the bracket 420 carrying a set of beams 83 and affixed to the pool wall 81.

In FIG. 7B, the bracket 420 is arranged in a first condition. The bottom panel 422 is down, the left and right panels 423 and 424 are bent up, perpendicular to the bottom panel 422. The back panel 425 has been bent to approximately ninety degrees with respect to the left panel 423, so that the bend 455 is received against the right panel 424. The bend 455 is bent ninety degrees back, away from the front edge 430 at the right panel 424. Thus, the left tab 426 extends rearwardly, away from the front edge 430, at roughly ninety degrees to the back panel 425. The right tab 427 projects directly back from the right panel 424. In this way, the left and right tabs 426 and 427 are in flush contact with each other and registered with each other. Their hole patterns 492 are likewise registered, such that a fastener can be sunk through the holes 493 or 494 in both left and right tabs 426 and 427. The bracket 420 defines a carriage 500 ready to receive a beam 83 or beams 83

In FIG. 7C, the left tab 426 is turned the other way. Rather than extending rearwardly away from the front edge 430, it extends forward to it. The left tab 426 is registered and in flush contact with the right panel 424. Fasteners can be sunk through the holes of either the left tab 426 or the right panel 424. The bracket 420 defines a carriage 500 ready to receive a beam 83 or beams 83.

Turning to FIG. 9A, generally, the bracket 420 will first be applied and secured to the pool wall 81 before a beam 83 is set into it. This is done by registering the bracket 420 with the pool wall 81 in the desired position of the bracket 420 and then driving fasteners through the holes 493 and 494 in the left and right tabs 426 and 427 and into the pool wall 81. This secures the bracket 420 to the pool wall 81. An opposing bracket 420 may be similarly secured at the other side of the pool 80. The beams 83 are then dropped into the U-shaped carriage 500 formed by the bottom panel 422, the left panel 423, the right panel 424, and the back panel 425. The back panel 425 limits axial movement of the beams 83 in the bracket 420, and the left and right panels 423 and 424 limit the lateral movement of the beams 83 in the bracket 420. Fasteners are then driven through the holes 491 in the left and right panels 423 and 424 to secure the beams 83 in the bracket 420. In this way, the bracket 420 is installed to the pool wall 81 and the beams 83 are installed in the bracket 420.

With the beams 83 so installed, the left and right tabs 426 and 427 are then bent with respect to the U-shaped carriage 500. Since the beam 83 extends out of the U-shaped carriage 500, it can be used as a long lever arm about the living hinges 456 and 483. The beam 83 is maneuvered to the desired orientation and the other end of the beam 83 is perhaps then similarly seated in another bracket 420, either with fasteners or directly to another framing element. The bracket 420 may be pivoted through a wide range of angles, preferably from zero degrees between the left tab 426 and the back panel 425 through to zero degrees between the right tab 427 and the right panel 424. When the proper orientation is achieved, the beams 83 can be shimmed a few inches up out of the bracket 420, and the decking planks 94 laid in position, such as in FIG. 2D. Then, the decking planks 94 can be easily cut to match the contour of the pool edge 86. Once so cut, the decking planks 94 are removed, the shims are removed, and the beams 83 can be secured in the brackets 420. Some minor shimming may still be necessary to precisely achieve the necessary elevation of the beam 83.

Figure 8B:
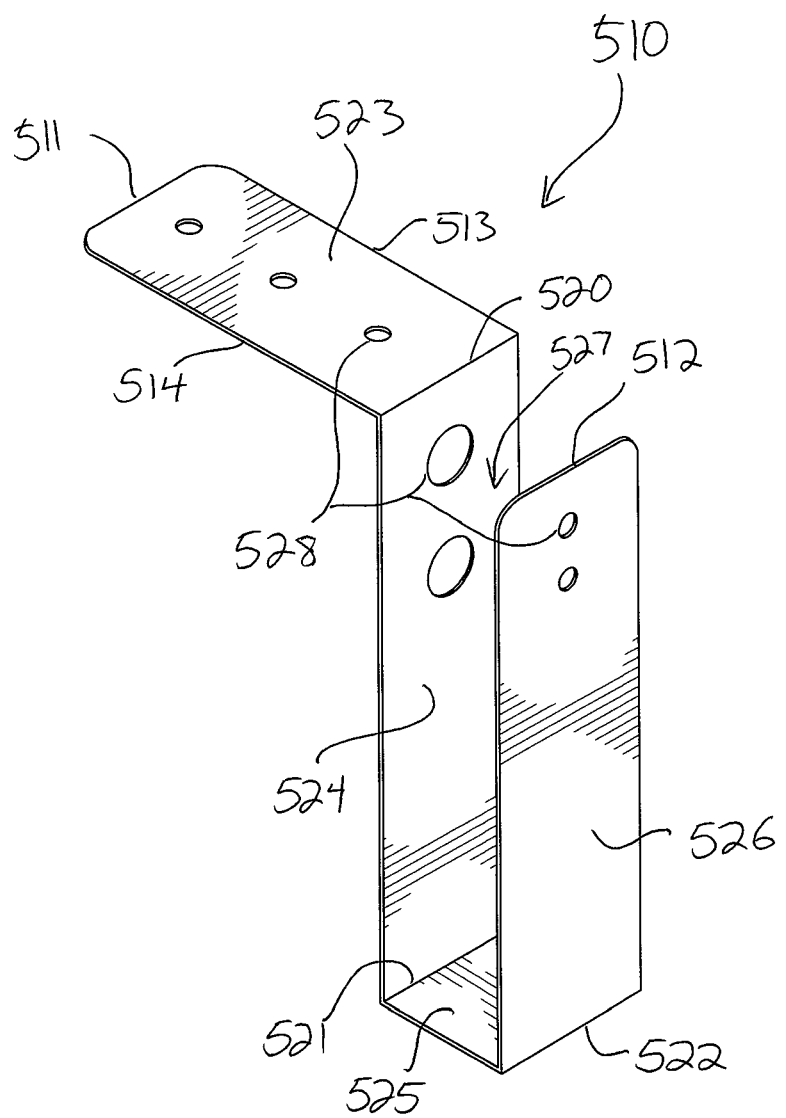
Figure 9B:
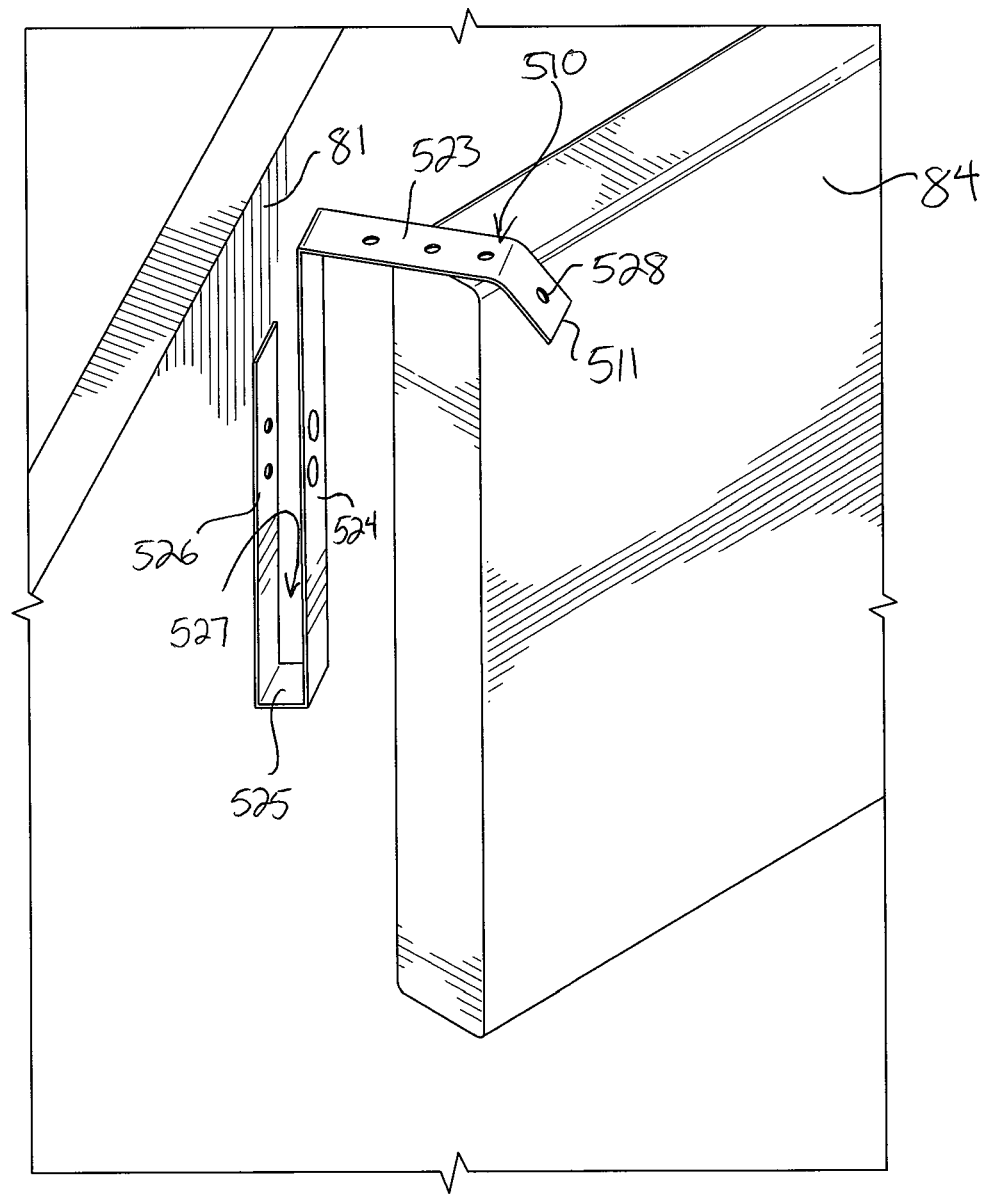

FIGS. 8A and 8B illustrates a perimeter support bracket 510 in flat and bent configurations. FIG. 9B shows the bracket 510 in use on a joist 84. The bracket 510 holds a perimeter support 93 as described above. The bracket 510 is an elongate strip of unitary material, integrally and monolithically formed as a single piece, preferably constructed of a material having very good rigidity, shear strength, durability, and anti-corrosion properties, such as galvanized steel. The bracket 510 is thin between opposed major faces.

The bracket 510 has opposed ends 511 and 512 and opposed longitudinal sides 513 and 514. Between the ends 511 and 512 are a plurality of bends. An outer bend 520 is proximate to the end 511. This is termed an outer bend, because, as is seen in FIG. 9B, the outer bend 520 forms an outside corner. Proximate to the end 512 are two inner bends 521 and 522, which form inside corners as shown in FIG. 9B.

The portion of the bracket 510 between the end 511 and the outer bend 520 is a top panel 523, the portion between the outer bend 520 and the inner bend 521 is a side panel 524, the portion between the inner bends 521 and 522 is a bottom panel, and the portion between the end 512 and the inner bend 522 is a side panel 526. In operation, the top 523 overlays a joist 84, and the side panel 524 hangs down therefrom. The side panels 524 and 526 cooperate with the bottom panel 525 to define a hold 527 for the perimeter support 93. Holes 528 through each panel allow the bracket 510 to be fastened to the joist 84 and allow the perimeter support 93 to be fastened to the bracket 510.

The bracket 510 is positionable in a variety of orientations. The joist 84 often is oriented at an irregular angle with respect to the pool wall 81, and the installer will frequently cut the joist 84 short, such that there is a gap between the end of the joist 84 and the wall 81. This provides space to run the perimeter support 93. To hold the perimeter support 93, the bracket 510 is attached to the end of the joist 84. But the bracket 510 is generally not simply aligned with the joist 84. Rather, the bracket 510 is aligned so as to allow the hold 528 to be parallel to the pool wall 81 locally. This may require the bracket 510 to be laid across the joist 84, as shown in FIG. 9B. In such circumstances, the top panel 523 of the bracket 510 is placed over the top of the joist 84 and any portion of the top panel 523 proximate the end 511 is folded or hammered over the side of the joist 84 and secured with a fastener. The top panel 84 is then also secured with a fastener to the top of the joist 84. In this way, the bracket 510 is secured on the joist 84, and the perimeter support 93 can be dropped into the hold 527. Fasteners are then driven through the holes 528 and into the perimeter support 93 to secure it therein.

FIG. 10 illustrates an embodiment of a bracket 530. The bracket 530 is shown in a flat, stamped configuration. The bracket 530 includes a thin body having a bottom panel 531, a left panel 532, a right panel 533, a back panel 534, a left tab 535, and a right tab 536. The body is unitary: the bottom panel 531, left panel 532, right panel 533, back panel 534, left tab 535, and right tab 536 are integrally and monolithically formed as a single piece, preferably constructed of a material having very good rigidity, shear strength, durability, and anti-corrosion properties, such as galvanized steel. The body is thin between its opposed surfaces.

The bracket 530 has a front edge 537 extending entirely along the left panel 532, the bottom panel 531, and the right panel 533. The bottom panel 531 of the bracket 530 extends rearward from this front edge 537 to define a flat lower support surface for a beam 83 (or two side-by-side beams 83) applied to the bracket 530. The bottom panel 531 has opposed sides at the left and right panels 532 and 533; the opposed sides are short and parallel to each other. The bottom panel 531 has a straight back edge 538.

Extending upward from the bottom panel 531 is the left panel 532. The left panel 532 is a tall panel, having a rectangular shape and bent to a normal orientation with respect to the bottom panel 531. The left panel 532 shares the front edge 537 and has an opposed back 539. Both the front edge 537 and the back 539 extend between a top 540 and opposed bottom 541 of the left panel 532, which are parallel to each other and perpendicular to the front edge 537 and the back 539. The left panel 532 is flat and smooth.

The back panel 534 extends away from the left panel 532 along the back 539. The back panel 534 is also flat and smooth, but is not quite as tall as the left panel 532. The back panel 534 has a top 542, aligned with and contiguous to the top 540 of the left panel 532. But the back panel 534 has an opposed bottom 543, which is disposed above the bottom 541 (and the bottom panel 531) when the bracket 530 is bent for operation. Because the back panel 534 is shorter than the left panel 532, it defines a gap between its bottom 543 and the bottom panel 531 of the bracket 530 itself. The back panel 534 is formed to the left panel 532 along a bend 544, shown in broken line in FIG. 10. The bend 544 is bent by the manufacturer during manufacture, and is preferably bent to a fixed and static angle of ninety degrees between the back panel 534 and the left panel 532.

Behind the back panel 534 is the left tab 535. The left tab 535 extends away from the back panel 534. The left tab 535 has the same height as the back panel 534, and its top 546 and bottom 547 are aligned with and contiguous to the top 542 and bottom 543 of the back panel 534, respectively. The left tab 534 is flat and smooth, and is formed to the back panel 534 along the living hinge 548 extending normal to and between the top 546 and the bottom 547. The living hinge 548 is suitable for being bent by installers in the field, and includes four slits along the living hinge 548. The slits are formed entirely though the thickness of the body 421, and as such, define voids or cavities in the body where there is less material, so that the body may be flexed more easily there than at other parts of the body.

Extending upward from the bottom panel 531 is the right panel 533. The right panel 533 is a tall panel, having a rectangular shape, and bent to a normal orientation with respect to the bottom panel 531. The right panel 533 shares the front edge 537 and has an opposed back 549. Both the front edge 537 and the back 549 extend between a top 550 and opposed bottom 551 of the right panel 533, which are parallel to each other and perpendicular to the front edge 537 and the back 549. The right panel 533 is flat and smooth.

The right tab 536 extends away from the right panel 533. The right tab 536 is not as tall as the right panel 533 but is coextensive to the left tab 534. Its top 552 is aligned with and contiguous to the top 550 of the right panel 533. Its bottom 553 extends to just short of the bottom 551 of the right panel 533. The right tab 536 is flat and smooth, and is formed to the right panel 533 along a living hinge 554 extending normal to and between the top 552 and the bottom 553. The living hinge 554 is suitable for being bent by installers in the field, and includes four slits along the living hinge 554. The slits are formed entirely though the thickness of the body, and as such, define voids or cavities in the body where there is less material, so that the body may be flexed more easily there than at other parts of the body. The right tab 536 corresponds in size and shape to the left tab 465.

Hole patterns are formed throughout the bracket 530. In the left and right panels 532 and 533 each, a hole pattern 555 includes a front row of four spaced-apart holes and a back row of four spaced-apart holes. These holes are small, circular, and suitable for receiving fasteners that secure the bracket 530 and the beam 83 it supports. In the left and right tabs 535 and 536 each, a hole pattern 556 includes an array of right large holes, four in a front row and four in a back row. The hole pattern 556 is identical on the left tab 535 and the right tab 536.

Figure 11A:
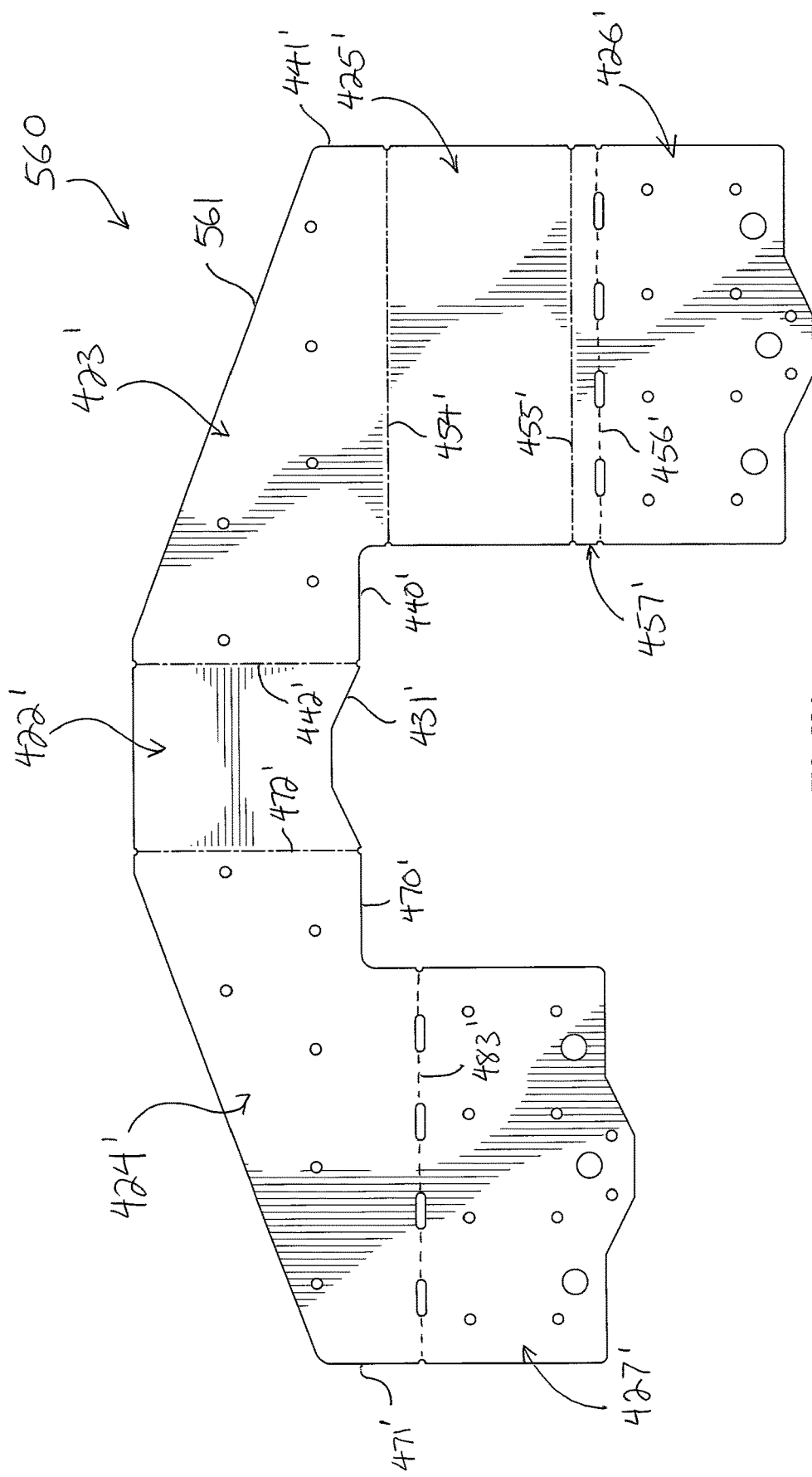
FIGS. 11A, and 11B are elevation and perspective views of an embodiment of a bracket for holding beams.
Figure 11B:
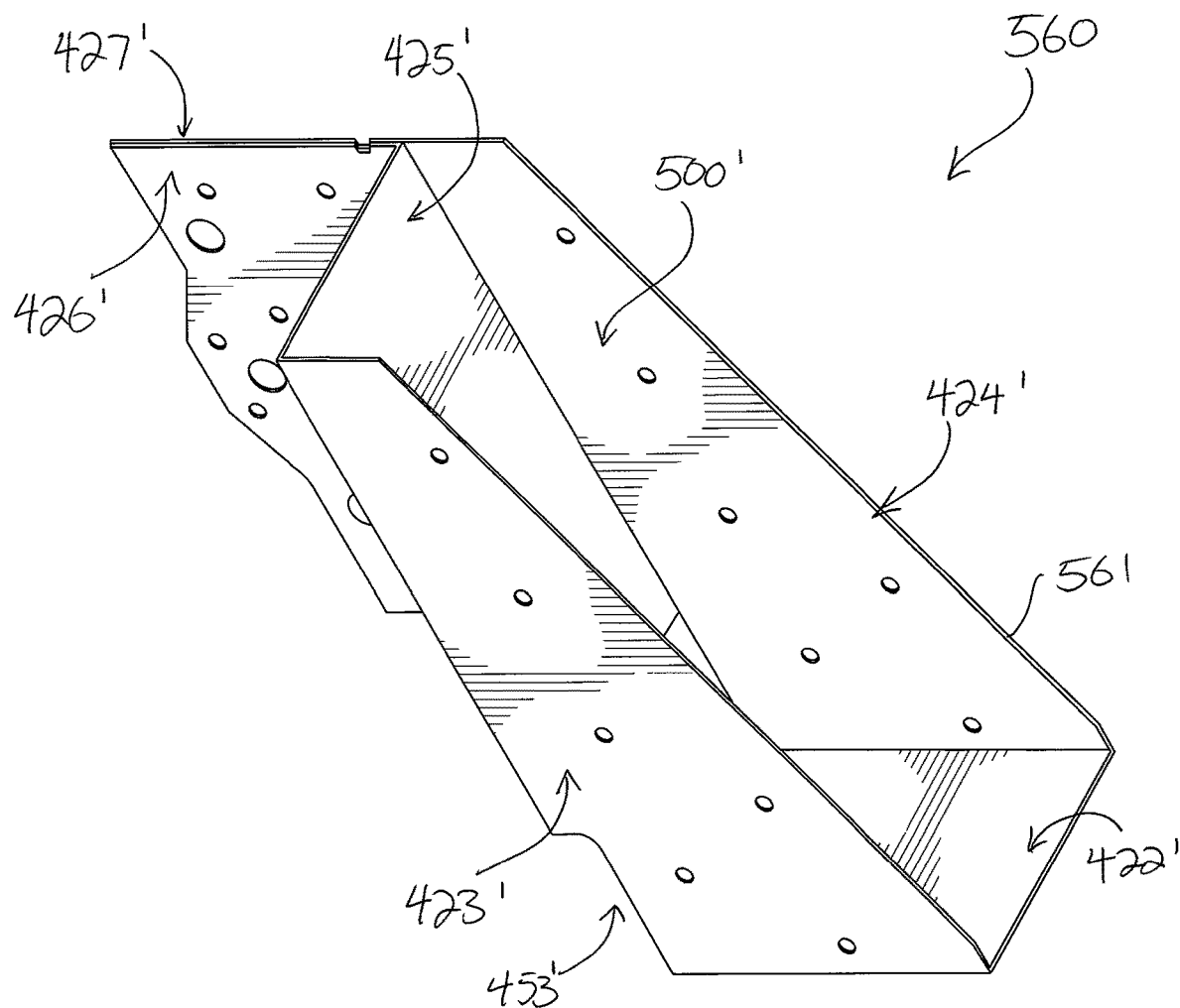

FIGS. 11A and 11B show another bracket 560. The bracket 560 is identical to the bracket 420 in every respect but for the front edge 430. As such, the description of the bracket 560 uses the reference characters for the structural elements and features of the bracket 420 to identify the same structural elements features of the bracket 560, but marks them with a prime ("'") symbol, so as to distinguish them from those of the bracket 420. Further, for brevity, since the structural elements and features of the bracket 420 have already been detailed, identical structural elements and features of the bracket 560 will not be described. Moreover, some of the reference characters for those structural elements and features may not be applied to FIGS. 11A and 11B, since one having ordinary skill in the art will readily appreciate their location from the description of the bracket 420.

As such, the bracket 560 has a body 421', bottom panel 422', left panel 423', right panel 424', back panel 425', left tab 426', right tab 427', back edge 431', back 440', top 441', bottom 442', top 451', bottom 452', gap 453', bend 454', bend 455', living hinge 456', extension 457', top 461', bottom 462', slits 464', projection 465', back 470', top 471', bottom 472', top 481', bottom 482', living hinge 483', slits 484', projection 485', hole pattern 490', holes 491', hole pattern 492', small holes 493', big holes 494', and carriage 500'.

While the front edge 430 of the bracket 420 is straight across the left panel 423, the bottom panel 422, and the right panel 424, the bracket 560 has a different front edge 561. Along the bottom panel 422', the front edge 561 is similar to the front edge 430, in that it is perpendicular to the bottoms 442' and 472'. But the front edge 561 is oriented at a diagonal on either side of the bottom panel 422'. On the left panel 423', the front edge 561 is oriented diagonally, tapering back from the bottom 442' to the top 441'. Similarly, on the right panel 424', the front edge 561 is oriented diagonally, tapering back from the bottom 472' to the top 471'. This has the effect, when the bracket 560 is bent into shape for use, as seen in FIG. 11B, of creating a deeper base to the carriage 500' proximate the bottom of the carriage 500' then at the top.

A preferred embodiment is fully and clearly described above so as to enable one having skill in the art to understand, make, and use the same. Those skilled in the art will recognize that modifications may be made to the description above without departing from the spirit of the specification, and that some embodiments include only those elements and features described, or a subset thereof. To the extent that modifications do not depart from the spirit of the specification, they are intended to be included within the scope thereof.

What is claimed is:

1. A bracket for hanging a beam with respect to a vertical surface, the bracket formed from a unitary sheet, the bracket comprising:
 a bottom panel;
 opposed left and right panels flanking the bottom panel;
 a back panel coupled to the left panel at a bend;
 a left tab coupled to the back panel at a living hinge;
 a right tab coupled to the right panel at another living hinge;
 wherein the left and right panels cooperate with the bottom panel and the back panel to define a U-shaped carriage configured to hold a beam; and
 at least one of the left and right tabs extends rearward from the U-shaped carriage to be anchored to the vertical surface.

2. The bracket of claim 1, wherein the bracket is asymmetric.

3. The bracket of claim 1, further comprising a front edge of the bracket extending continuously along the right panel, the bottom panel, and the left panel.

4. The bracket of claim 3, wherein the left panel, the back panel, and the left tab each have tops, and the tops of the left panel, back panel, and left tab are continuous with each other.

5. The bracket of claim 4, wherein the right panel and the right tab each have tops, and the tops of the right panel and the right tab are continuous with each other.

6. The bracket of claim 3, wherein the right panel and the right tab each have tops, and the tops of the right panel and the right tab are continuous with each other.

7. The bracket of claim 1, further comprising:
 a first configuration of the bracket, wherein the left and right tabs are registered in contact with each other, both projecting away from the right panel; and
 a second configuration of the bracket, wherein the left tab and the right panel are registered in contact with each other, both projecting away from the right tab.

8. The bracket of claim 1, further comprising coextensive projections extending outward from each of the right and left tabs.

9. The bracket of claim 1, further comprising a bend between the bottom panel and the right panel and between the bottom panel and the right panel.

10. The bracket of claim 1, further comprising a flat configuration of the bracket, wherein the bracket has a C shape.

11. A bracket for hanging a beam with respect to a vertical surface, the bracket comprising:
 a bottom panel;
 opposed left and right panels flanking the bottom panel;
 a back panel coupled to the left panel;
 a left tab coupled to the back panel;
 a right tab coupled to the right panel;
 wherein the left and right panels cooperate with the bottom panel and the back panel to define a U-shaped carriage configured to hold a beam; and
 at least one of the left and right tabs extends rearward from the U-shaped carriage to be anchored to the vertical surface.

12. The bracket of claim 11, wherein the bracket is asymmetric.

13. The bracket of claim 11, further comprising a front edge of the bracket extending continuously along the right panel, the bottom panel, and the left panel.

14. The bracket of claim 13, wherein the left panel, the back panel, and the left tab each have tops, and the tops of the left panel, back panel, and left tab are continuous with each other.

15. The bracket of claim 14, wherein the right panel and the right tab each have tops, and the tops of the right panel and the right tab are continuous with each other.

16. The bracket of claim 13, wherein the right panel and the right tab each have tops, and the tops of the right panel and the right tab are continuous with each other.

17. The bracket of claim 11, further comprising:
- a first configuration of the bracket, wherein the left and right tabs are registered in contact with each other, both projecting away from the right panel; and
- a second configuration of the bracket, wherein the left tab and the right panel are registered in contact with each other, both projecting away from the right tab.

18. The bracket of claim 11, further comprising coextensive projections extending outward from each of the right and left tabs.

19. The bracket of claim 11, further comprising:
- a living hinge between the left tab and the back panel; and
- a bend adjacent the living hinge, cooperating with the living hinge to define an extension between the left tab and the back panel;
- wherein the extension offsets the living hinge from the back panel.

20. The bracket of claim 11, further comprising a flat configuration of the bracket wherein the bracket has a C shape.

* * * * *